United States Patent
Hyun et al.

(10) Patent No.: US 9,798,460 B2
(45) Date of Patent: Oct. 24, 2017

(54) MOBILE TERMINAL AND METHOD FOR CONTROLLING THE SAME

(71) Applicant: LG ELECTRONICS INC., Seoul (KR)

(72) Inventors: Juha Hyun, Seoul (KR); Shinnyue Kang, Seoul (KR); Yoonseok Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/948,047

(22) Filed: Nov. 20, 2015

(65) Prior Publication Data
US 2016/0357392 A1 Dec. 8, 2016

(30) Foreign Application Priority Data
Jun. 4, 2015 (KR) ........................ 10-2015-0079297

(51) Int. Cl.
*G06F 3/041* (2006.01)
*G06F 3/0488* (2013.01)
*G06F 3/0482* (2013.01)
*G06F 3/0484* (2013.01)
*G06F 3/0486* (2013.01)

(52) U.S. Cl.
CPC .......... *G06F 3/0488* (2013.01); *G06F 3/0482* (2013.01); *G06F 3/0486* (2013.01); *G06F 3/04842* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| 2010/0269040 | A1 | 10/2010 | Lee | |
|---|---|---|---|---|
| 2012/0174042 | A1* | 7/2012 | Chang | ................... G06F 3/0488 715/863 |
| 2013/0082945 | A1 | 4/2013 | Jo | |
| 2014/0115455 | A1 | 4/2014 | Kim | |
| 2014/0298268 | A1* | 10/2014 | Kang | .................. G06F 3/04847 715/841 |

FOREIGN PATENT DOCUMENTS

| EP | 2284674 | 2/2011 |
|---|---|---|
| WO | 2015026651 | 2/2015 |

OTHER PUBLICATIONS

European Patent Office Application Serial No. 16162479.6, Search Report dated Oct. 31, 2016, 8 pages.

* cited by examiner

*Primary Examiner* — Joseph Haley
(74) *Attorney, Agent, or Firm* — Lee, Hong, Degerman, Kang & Waimey PC

(57) ABSTRACT

Disclosed are a mobile terminal and a method for controlling the same. The mobile terminal includes a touch screen disposed at a first side of the mobile terminal and configured to display information; and a controller configured to: divide the touch screen into a plurality of regions corresponding to a first function in response to a touch drag starting from a preset point on the first side, wherein the plurality of regions correspond to a plurality of sub-menus of the first function; execute the first function according to a sub-menu corresponding to a region where the touch drag is released; and cause the touch screen to display an execution screen of the executed first function according to the sub-menu to at least part of the touch screen.

19 Claims, 19 Drawing Sheets

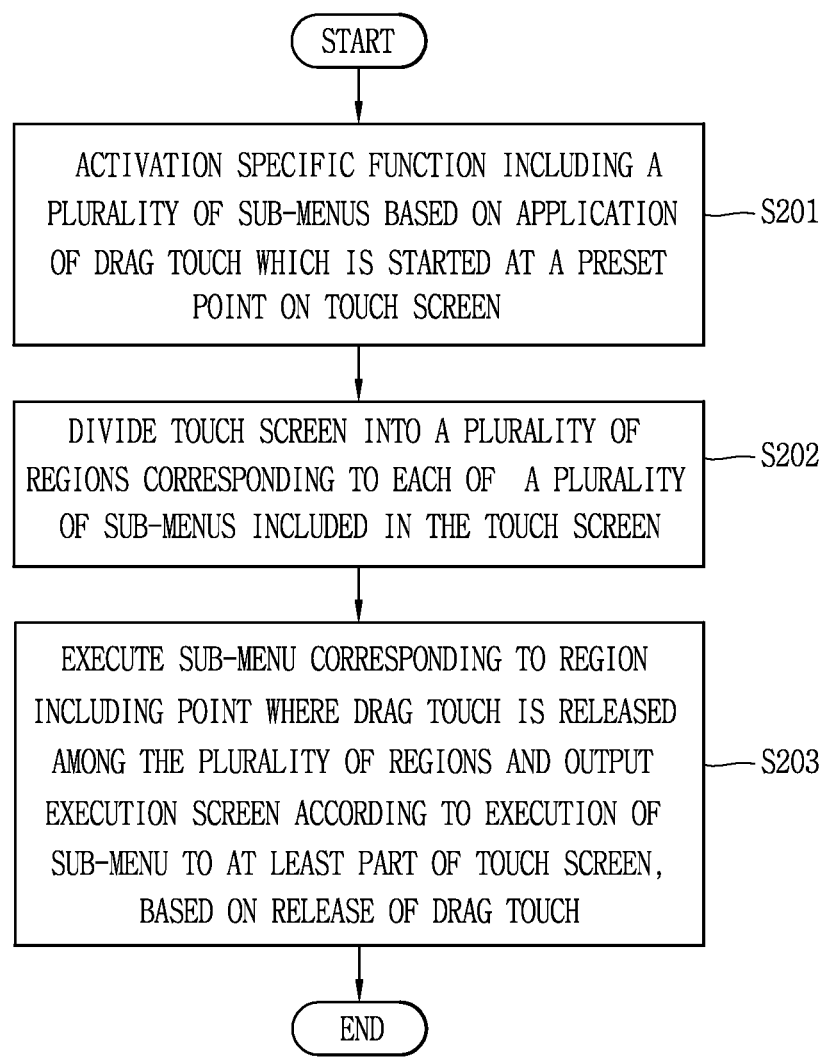

MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2015-0079297, filed on Jun. 4, 2015, the contents of which is incorporated by reference herein in its entirety.

BACKGROUND OF THE INVENTION

1. Field of the Invention

The present invention relates to a mobile terminal capable of executing a sub-menu included in one function, and a method for controlling the same.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

Meanwhile, the functions which are executable by the mobile terminal include a plurality of sub-menus related to the functions, respectively. However, since the types and numbers of the sub-menus are large and various, there has been inconvenience in that when a user uses such sub-menus, the user has to first search such functions and additionally search the sub-menus included in the functions, and then select the desired sub menu.

SUMMARY OF THE INVENTION

It is an object of the present invention to provide a mobile terminal and a method for controlling the same capable of easily executing a sub-menu included in one function.

To achieve these and other advantages and objects of the present invention, there is provided a mobile terminal including a touch screen configured to sense a touch; and a controller configured to activate a specific function including a plurality of sub-menus based on application of a drag touch which is started at a preset point on the touch screen, and to divide the touch screen into a plurality of regions corresponding to a plurality of sub-menus, respectively, included in the specific function, wherein the controller may be configured to execute a sub-menu corresponding to a region including a point where the drag touch is released among the plurality of regions, based on release of the drag touch; and to control the touch screen to output an execution screen according to execution of the sub-menu to at least part of the touch screen.

In one embodiment, the preset point may be determined based on a position where a specific touch input is applied to the touch screen.

In one embodiment, the specific function may be varied depending on a position where the specific touch input is applied on the touch screen.

In one embodiment, the preset point may be a point where a function icon corresponding to the specific function is outputted in a case where screen information is outputted to the touch screen.

In one embodiment, the controller may divide the plurality of regions based on a position of the preset point on the touch screen.

In one embodiment, the controller may control the touch screen to display information on a sub-menu corresponding to each of the plurality of regions, based on movement of the drag touch on the plurality of regions.

In one embodiment, the controller may be configured to control the touch screen to output information on a first sub-menu corresponding to a first region in a case where the drag touch is located on the first region among the plurality of regions, and to control the touch screen to terminate displaying of the first sub-menu and control the touch screen to output information on a second sub-menu corresponding to the second region in a case where the drag touch is moved from the first region to the second region, which is different from the first region, among the plurality of regions.

In one embodiment, the information on the first sub-menu may be displayed on the first region, and the information on the second sub-menu may be displayed on the second region.

In one embodiment, an execution screen according to execution of the second sub-menu may be outputted to the second region in a case where the drag touch is released on the second region.

In one embodiment, the controller may execute the first and second sub-menus together in a case where the drag touch is held on the first region for a predetermined time and the held drag touch is released on the second region after moving to the second region.

In one embodiment, the controller may control the touch screen to output an execution screen according to execution of the first sub-menu and an execution screen according to execution of the second sub-menu together to at least part of the touch screen.

In one embodiment, the controller may control the touch screen to maintain displaying of information on the first sub-menu, though the drag touch held on the first region is moved to the second region.

In one embodiment, the controller may be configured to activate a first function and a second function as a specific function based on satisfaction of the preset point to a specific condition, to divide the touch screen into a plurality of regions by a plurality of sections which are divided as much as the number of the sub-menus included in the first function from the preset point along a first direction and a plurality of sections which are divided as much as the number of the sub-menus included in the second function from the preset point along a second direction, and to execute at least one function between a sub-menu of the first function and a sub-menu of the second function based on the specific region in a case where the drag touch is released on the specific region among the plurality of regions.

In one embodiment, the controller may be configured to select the sub-menu of the first function and the sub-menu of the second function corresponding to a position of the specific region of the touch screen, and consecutively execute the selected sub-menus of the first and second functions.

In one embodiment, the controller may be configured to execute the sub-menu of the second function using a specific data related to execution of the sub-menu of the first function in a case where the sub-menu of the first function is first executed.

According to another aspect of the present invention, there is also provided a method for controlling a mobile terminal, including: (a) activating a specific function including a plurality of sub-menus based on application of a drag touch starting from a preset point on the touch screen; (b) dividing the touch screen into a plurality of regions corresponding to each of the plurality of sub-menus included in the specific function; executing a sub-menu corresponding to a region including a point where the drag touch among the plurality of regions is released, based on release of the drag touch; and outputting an execution screen according to execution of the sub-menu to at least part of the touch screen.

In one embodiment, the preset point may be determined by a position where a specific touch input is applied to the touch screen.

In one embodiment, the type of the specific function is varied according to a position where the specific touch input is applied on the touch screen.

In one embodiment, the plurality of regions may be divided based on a position of the preset point on the touch screen.

In one embodiment, the control method may further include displaying information on the sub-menu corresponding to each of the plurality of regions on the touch screen, based on movement of the drag touch on the plurality of regions.

Further, to achieve these and other advantages and objects of the present invention, there is provided a mobile terminal including a touch screen disposed at a first side of the mobile terminal and configured to display information; and a controller configured to: divide the touch screen into a plurality of regions corresponding to a first function in response to a touch drag starting from a preset point on the first side, wherein the plurality of regions correspond to a plurality of sub-menus of the first function; execute the first function according to a sub-menu corresponding to a region where the touch drag is released; and cause the touch screen to display an execution screen of the executed first function according to the sub-menu to at least part of the touch screen.

In one embodiment, the preset point is determined based on a position where a specific touch input is applied to the first side.

In one embodiment, the first function is based on a position where the specific touch input is applied to the touch screen.

In one embodiment, the preset point corresponds to a display position of a function icon corresponding to the first function when screen information is displayed on the touch screen.

In one embodiment, the controller is further configured to divide the plurality of regions based on a position of the preset point on the first side.

In one embodiment, the controller is further configured to cause the touch screen to display information related to each corresponding sub-menu as the touch drag is moved across the plurality of regions.

In one embodiment, the controller is further configured to: cause the touch screen to display first information related to a first sub-menu corresponding to a first region when the touch drag is located at the first region; and cause the touch screen to terminate displaying the first information and display second information related to a second sub-menu corresponding to a second region when the touch drag is moved from the first region to the second region.

In one embodiment, the first information is displayed on the first region and the second information is displayed on the second region.

In one embodiment, the controller is further configured to execute the first function according to the second sub-menu and cause the touch screen to display an execution screen of the first function according to the second sub-menu when the touch drag is released at the second region.

In one embodiment, the controller is further configured to execute the first function according to the first sub-menu and the second sub-menu when the touch drag is maintained at the first region for a predetermined length of time then moved to the second region and released at the second region.

In one embodiment, the controller is configured to cause the touch screen to display a first execution screen corresponding to the executed first function according to the first sub-menu and a second execution screen corresponding to the executed first function according to the second sub-menu to at least part of the touch screen.

In one embodiment, the controller is further configured to cause the touch screen to continue displaying the first information when the touch drag is moved to the second region.

In one embodiment, the plurality of regions are divided along a first direction and a second direction; a first sub-group of regions divided along the first direction correspond to sub-menus of the first function; a second sub-group of regions divided along the second direction correspond to sub-menus of a second function, wherein the first sub-group of regions and the second sub-group of regions intersect; and the controller is further configured to execute at least the first function according to a sub-menu of the first function or execute the second function according to a sub-menu of the second specific function when the touch drag is released at a specific region.

In one embodiment, the controller is further configured to: select the sub-menu of the first function and the sub-menu of the second function based on a position of the specific region of the touch screen; and consecutively execute the first function according to the sub-menu of the first function and the second function according to the sub-menu of the second function.

In one embodiment, the controller is further configured to execute the second function according to the sub-menu of the second function using specific data related to execution of the first function according to the sub-menu of the first function when the first function is executed.

BRIEF DESCRIPTION OF THE DRAWING

The present invention will become more fully understood from the detailed description given herein below and accompanying drawings, which are given by illustration only, and thus are not limitative of the present invention, and wherein:

FIG. 2A is a flowchart illustrating a control method according to an embodiment of the present invention;

DETAILED DESCRIPTION OF THE PREFERRED EMBODIMENTS

Figure 1A:
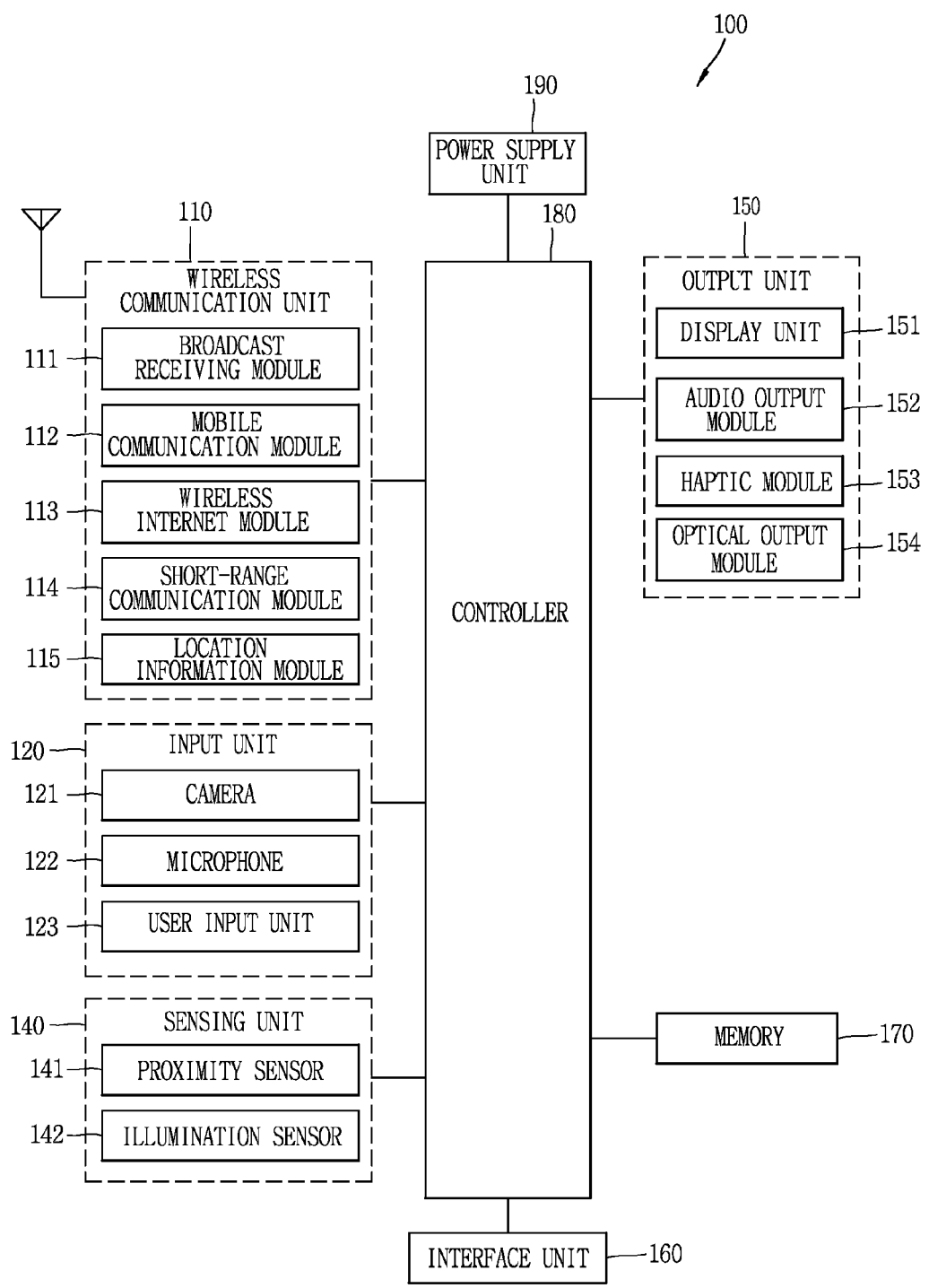
FIG. 1A is a block diagram illustrating a schematic configuration for explaining a mobile terminal according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
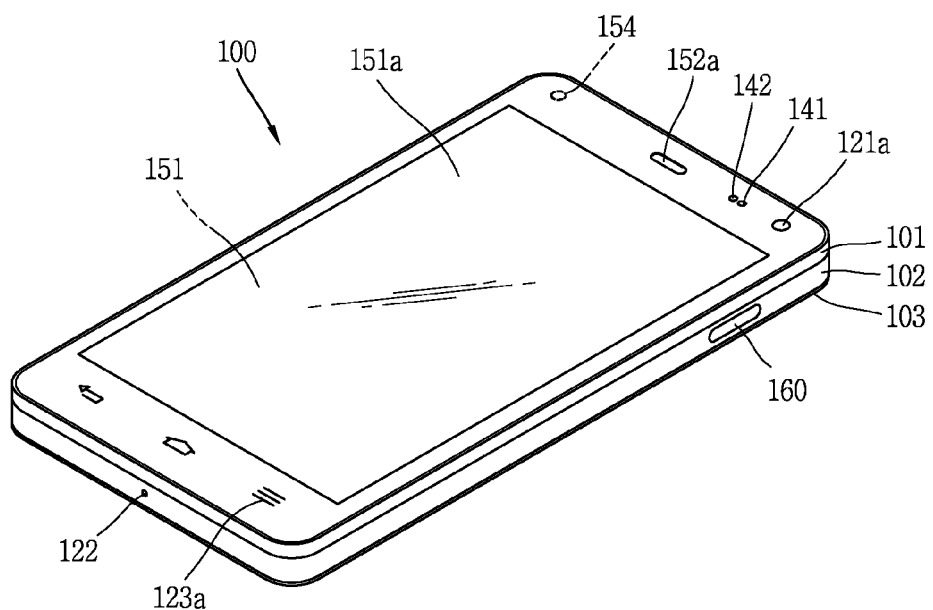
FIGS. 1B and 1C are views illustrating a schematic configuration of a mobile terminal, viewed from different directions according to an embodiment of the present invention.
Figure 1C:
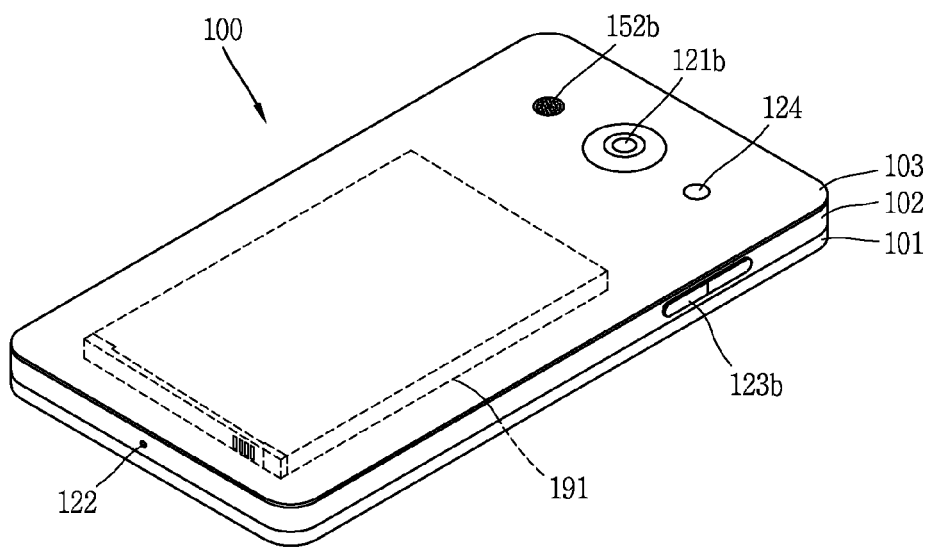

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-Wide Band (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal according to an embodiment of the present invention can immediately execute at least one sub-menu among a plurality of sub-menus included in a specific function using one touch. Accordingly, a user can be provided with convenience in that a series of processes in which the touch screen is activated, the specific function is searched, and then at least one of the plurality of sub-menus included in the specific function is selected and executed, are omitted.

Hereinafter, embodiments related to a control method which may be implemented in the mobile terminal, will be described with reference to the accompanying drawings.

Figure 2B:
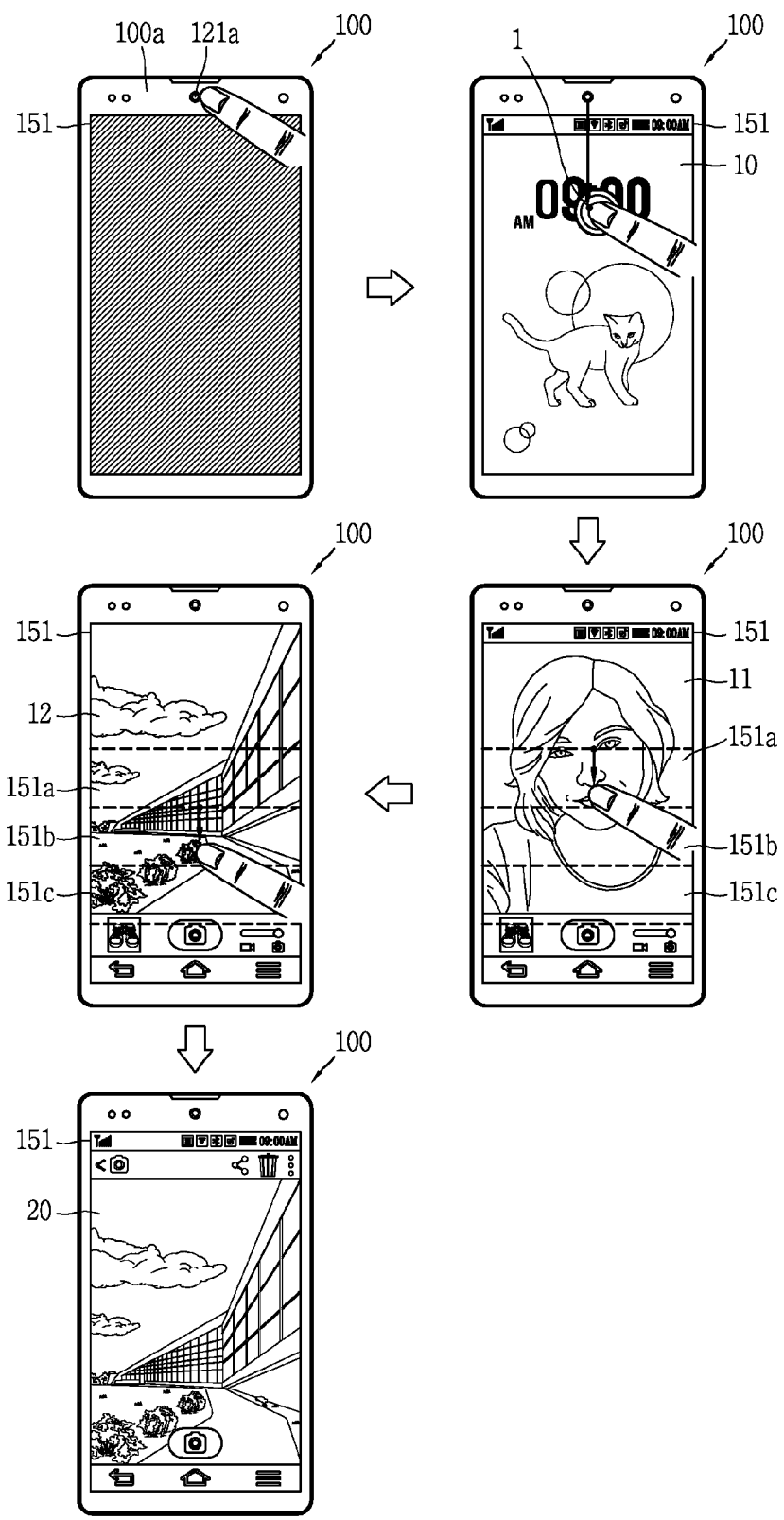
FIGS. 2B and 2C are representative views illustrating a control method according to an embodiment of the present invention.
Figure 2C:
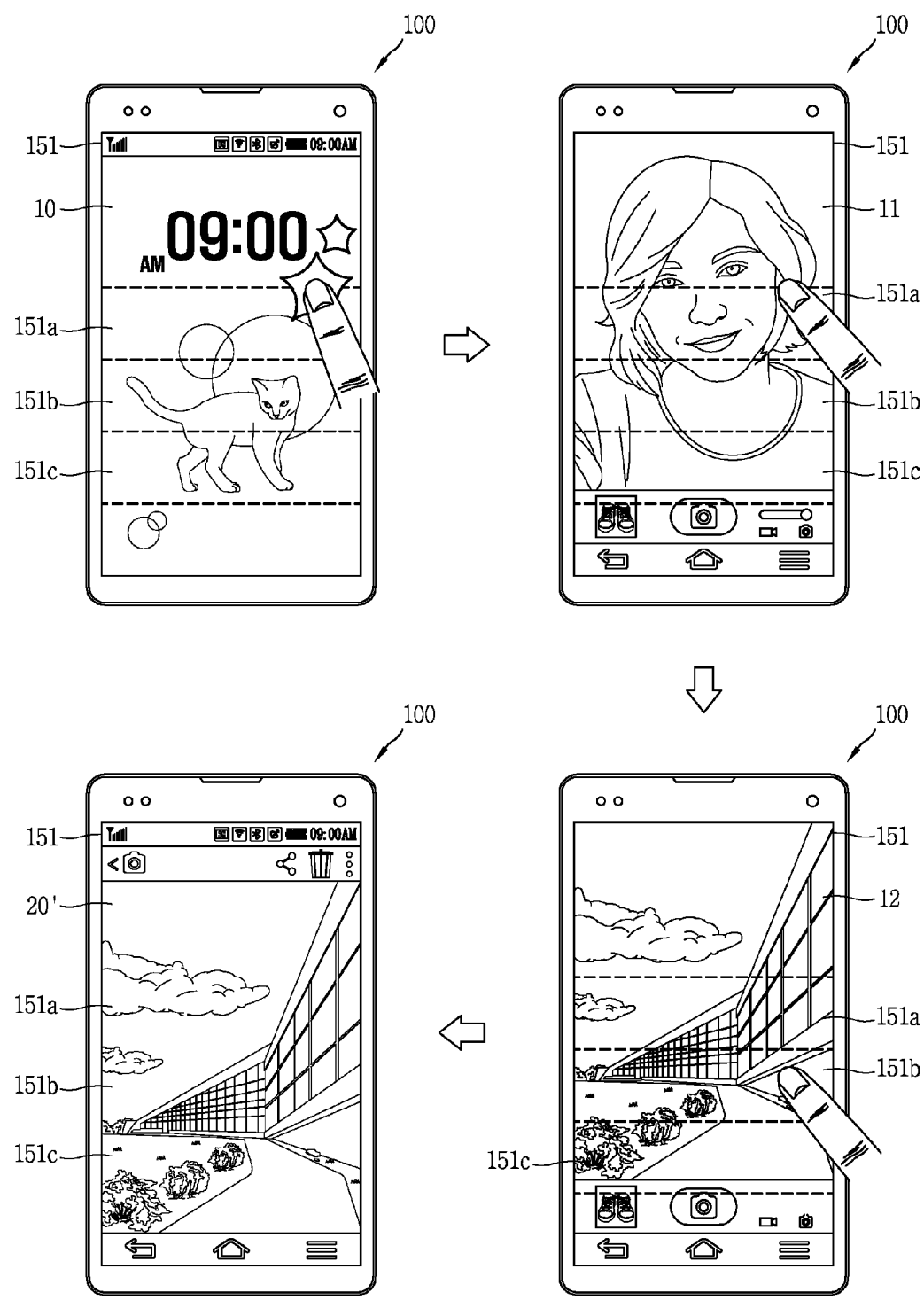

FIG. 2A is a flowchart illustrating a control method according to an embodiment of the present invention; and FIGS. 2B and 2C are representative views illustrating a control method according to an embodiment of the present invention.

Referring first to FIG. 2A, the mobile terminal according to one embodiment of the present invention may include a touch screen which is configured to sense a touch. The controller 180 may activate a specific function including a plurality of sub-menus based on application of a drag touch which is started from a preset point on the touch screen (S201).

The preset point is an arbitrary point that is one point on the touch screen 151, and may be determined by a point on the touch screen 151 where a specific touch input is applied.

Here, the specific touch input may be set by various types of touch inputs. For instance, in a case where a drag touch input applied from the bezel part, which is formed to enclose the touch screen 151, of the mobile terminal toward the touch screen 151 is held at one point on the touch screen 151, it may be a touch input which has been held.

That is, referring to FIG. 2B, a drag touch may be applied from one point (for instance, one point where a front camera 121a is located) of the bezel part 100a toward the touch screen 151, in a state that a lighting of the touch screen 151 is inactivated. Further, the drag touch may be held on one point of the touch screen 151.

In this instance, the controller 180 may activate the lighting of the touch screen 151 and output screen information 10 based on holding of the drag touch, as shown in the second drawing of FIG. 2B. Further, the held point may be determined as the preset point 1.

Unlike this, the specific touch input may be defined as a tap input of a preset number, or a specific touch input forming a specific pattern. That is, as shown in the first drawing of FIG. 2C, a point where a tap input of a preset number is consecutively applied, may be the preset point, in a state that screen information is outputted to the touch screen 151.

However, the preset point is not limited to a point where the specific touch input is applied, but may be a point of which a position is predetermined by a user's setting. Further, the preset point may be determined based on the state of the touch screen. For instance, though the same touch input is applied, different points may be determined as the preset point based on the state of the touch screen. Further, in a state that the lighting of the touch screen 151 is inactivated, a point where the specific touch input is applied may be determined as the preset point, and in a case where screen information is outputted to the touch screen 151, a point where a function icon corresponding to the specific function is outputted by a user's request may be determined as a preset point.

Here, the user's request may be variously defined like the aforementioned specific touch input, an input to press a hardware key provided in the terminal body of the mobile terminal, a preset voice command input, a preset gesture input, and the like.

Further, the function icon may be outputted to various positions on the screen information according to user's request. That is, when a user's request is received in a state that screen information is outputted to the touch screen 151, the controller 180 may output a function icon corresponding to the specific function on one region of the screen information which is determined according to the user's request. When the specific function is plural, the controller 180 may output a function icon corresponding to each of the specific functions to one region of the touch screen.

The function icon may be outputted to the touch screen in a various manner, such as in a floated type to one region of the screen information in an overlapping manner, or to a specific region of the screen information with a preset transparency.

Meanwhile, the specific function may be defined as all kinds of functions including a plurality of sub-menus among functions which are executable in the mobile terminal.

For instance, the specific function may be a function corresponding to a specific application including a plurality of sub-menus. More specifically, the specific function may be a function corresponding to a camera application including a capturing menu to a rear surface of the mobile terminal, a capturing menu to a front surface of the mobile terminal, a video capturing menu, and the like.

Further, the specific function may be activated based on application of a drag touch which is started from the preset point. Here, activating a specific function may mean that a specific function corresponding to the preset point among the plurality of functions which are executable in the mobile terminal is selected, and at least one sub-menu included in the specific function is converted into an immediately executable state.

The specific function is a function that is set to correspond to the preset point, and the type of the specific function may be varied depending on a position of the preset point. For instance, the type of the specific function may be determined according to a position where the specific touch input is applied, or a function icon to which the drag touch is applied among the plurality of function icons which are outputted to the touch screen 151. The types of the specific functions will be described later, with reference to FIGS. 3A through 3C.

When the specific function is activated, the controller 180 may divide the touch screen 151 into a plurality of regions corresponding to each of the plurality of sub-menus included in the specific function (S202).

That is, when the specific function is activated, the controller 180 may divide the touch screen 151 to correspond to the number of the plurality of sub-menus included in the specific function.

For instance, the controller 180 may divide the touch screen 151 as much as the number of all kinds of the sub-menus included in the specific function.

As another example, the controller 180 may divide the touch screen 151 as much as the number of part of the sub-menus which are selected based on the preset standard among the plurality of sub menus included in the specific function. Here, the preset standard may be related to at least one of the cases that it is used by a user more than the preset number, it was used recently (for instance, from the preset period to the present) from the time that the specific function is activated, or a selection by a user's setting.

Further, the controller 180 may divide the plurality of regions based on the position of the preset point. For instance, when the preset point is located at an upper end of the touch screen 151, the controller 180 may divide the plurality of regions along the upper end toward the lower end of the touch screen 151. That is, as shown in the second drawing of FIG. 2B, when the preset point 1 is located at the upper end of the touch screen 151, the plurality of regions 151a, 151b and 151c may be divided along the upper end toward the lower end of the touch screen 151.

Further, for instance, when the preset point is located at a center of the touch screen 151, the controller 180 may divide the plurality of regions along an edge region of the touch screen 151 enclosing the center.

Each of the plurality of regions which have been divided as above may be set to have a different size, shape and position. That is, each of the plurality of regions may be formed in the same ratio and size, and the size and shape thereof may be different from each other based on a specific standard. For instance, one region corresponding to a sub-menu which has a high frequency of use among the plurality of sub-menus may be formed to be larger than others.

When the plurality of regions are divided and the drag touch is released from the touch screen 151, the controller 180 may execute at least part of the plurality of sub menus. More specifically, the controller 180 may execute a sub-menu corresponding to a region including a point where the drag touch is released among the plurality of regions, based on release of the drag touch, and output an execution screen according to the execution of the sub-menu to at least part of the touch screen 151 (S203).

When the drag touch is moved, the controller 180 may identify a position of the drag touch on the touch screen 151. More specifically, the controller 180 may identify a region where the moved drag touch is located among the plurality of regions and provide a user information on the sub-menu corresponding to the region where the drag touch is located.

That is, as shown in the third drawing of FIG. 2B and the second drawing of FIG. 2C, when the drag touch is located at one region 151a among the plurality of regions, the controller 180 may display information 11 (information on a front capturing menu in case of a camera application) on a sub-menu which is set to correspond to the one region 151a on the touch screen 151.

Further, as shown in the fourth drawing of FIG. 2B and the third drawing of FIG. 2C, when the drag touch is moved from one region 151a to another region 151b, the controller 180 may display information 12 on a sub-menu (for instance, rear capturing menu) which is set to correspond to the other region 151b on the touch screen 151.

When the drag touch which is being moved is released at one region among the plurality of regions, the controller 180 may execute a sub-menu corresponding to the one region. That is, as shown in the fourth drawing of FIG. 2B, when the drag touch which is located at the one region 151a is released at the other region 151b, the rear capturing mode may be executed based on release of the drag touch.

Further, the controller 180 may output an execution screen of a sub-menu corresponding to a region where the drag touch is released to at least part of the touch screen 151. That is, as shown in the fifth drawing of FIG. 2B, a preview screen 20 according to execution of the rear capturing mode may be outputted to the touch screen 151. Otherwise, as shown in the fourth drawing of FIG. 2C, an image 20' which is captured according to execution of the rear capturing menu may be outputted to the touch screen 151.

As described hereinbefore, the mobile terminal according to one embodiment of the present invention can immediately execute one sub-menu included in the specific function by applying a drag touch one time from a preset point of the touch screen 151. Thus, it is possible to eliminate a plurality of steps in which a specific function is searched, a sub-menu to be executed is selected and then the sub-menu is executed, by simply applying a drag touch one time by a user.

As described above in detail, the specific function is a function which is set to correspond to the preset point, different types of functions may be activated as the specific function according to the preset point.

The preset point may be determined based on a position where a specific touch input is applied to the touch screen 151. In this instance, different types of specific functions may be selected according to a position where the specific touch input is applied to the touch screen 151.

Further, the preset point may be determined based on a user's setting or a state of the touch screen 151. For instance, the preset point may be differently determined based on whether a lighting of the touch screen 151 is inactive state or screen information is outputted to the touch screen 151. In this instance, the type of the specific function may be varied according to the state of the touch screen 151.

Figure 3A:
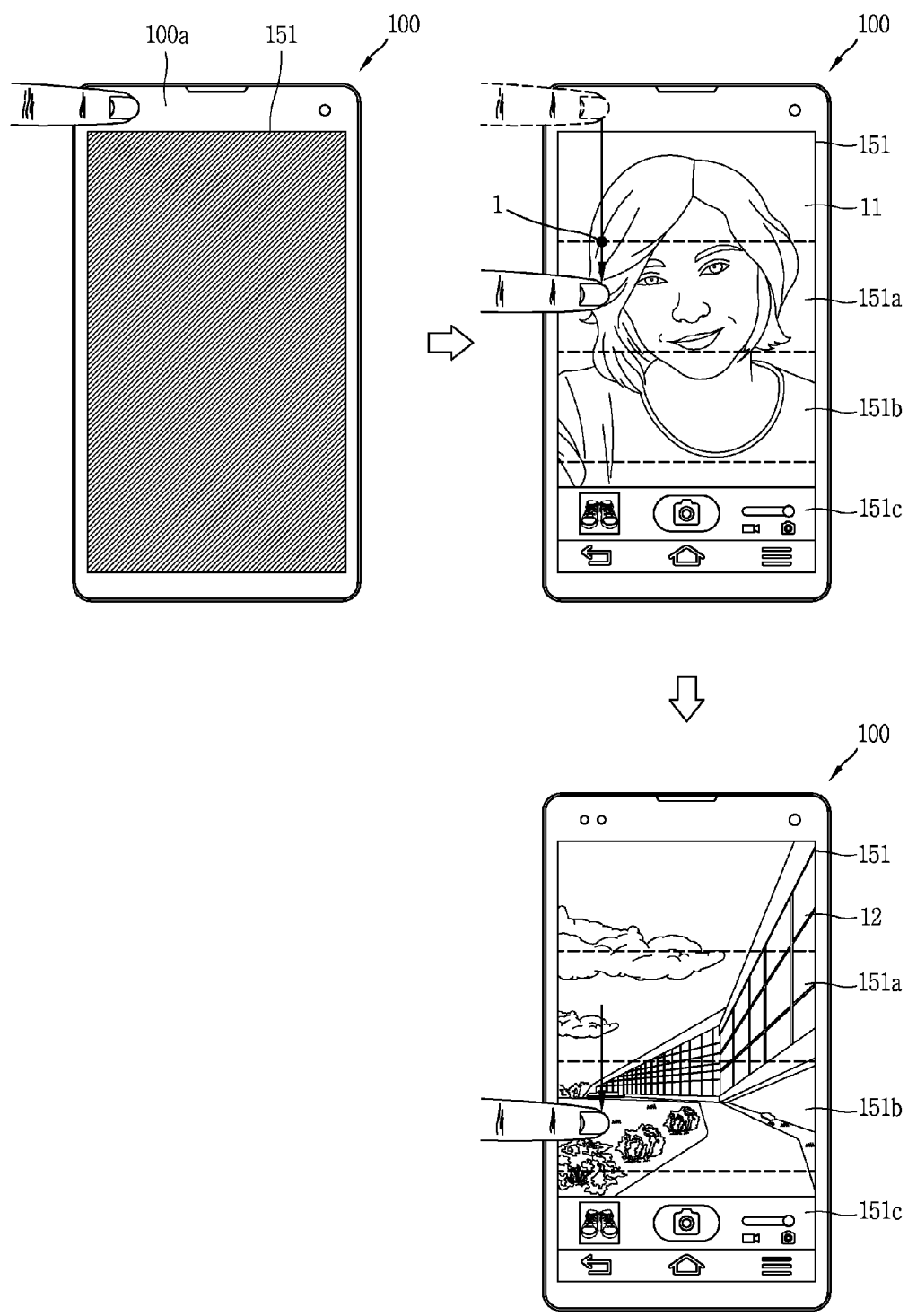
FIGS. 3A, 3B, and 3C are views illustrating an activation of different kinds of specific functions based on a preset point.
Figure 3B:
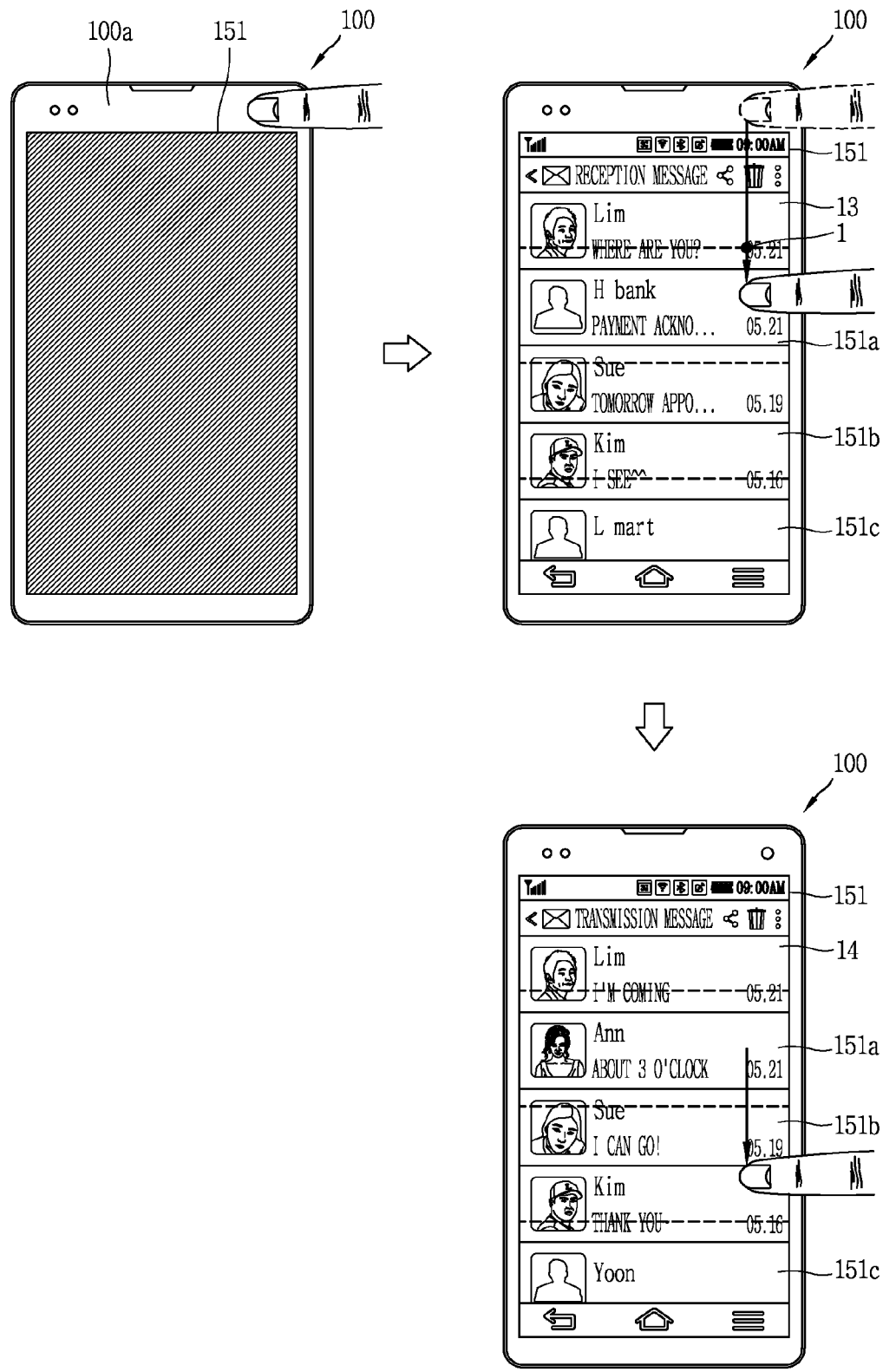
Figure 3C:
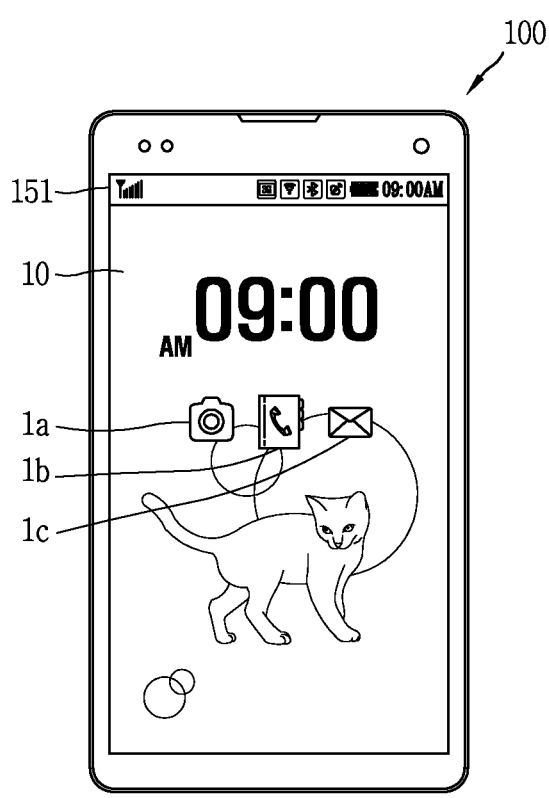

FIGS. 3A through 3C are views illustrating an embodiment related to an activation of different specific functions based on a preset point.

Referring to FIG. 3A, a lighting of the touch screen 151 is in an inactive state and a drag touch may be applied to a left upper end of the bezel part 100a. In this instance, when the drag touch which is started from the left upper end of the bezel part 100a is applied to the touch screen 151, the controller 180 may determine the drag touch as the specific touch input.

Further, the controller 180 may determine a point which is distant as much as a preset distance from a point where the drag touch is started on the touch screen 151 as the preset point 1, and then activate a specific function (camera application) which is set to correspond to the preset point 1.

As the camera application is activated, the controller 180 may divide the touch screen 151 into a plurality of regions 151a, 151b and 151c based on the preset point 1, and then make the plurality of sub-menus included in the camera application correspond to the plurality of regions 151a, 151b and 151c, respectively.

Thus, as shown in the second drawing of FIG. 3A, when the drag touch is located at the one region 151a in an unreleased state, information 11 on the front capturing menu may be displayed on the touch screen 151. Further, when the drag touch which has been located at the one region 151a is moved to the other one region 151b, information 12 on the rear capturing menu which is set to correspond to the other one region 151b may be displayed on the touch screen 151.

Unlike this, as shown in the first drawing of FIG. 3B, when a drag touch is stared from a right upper end of the bezel part 100a and consecutively applied to the touch screen 151, the controller 180 may activate a message application function corresponding to the preset point 1.

Further, as shown in the second drawing of FIG. 3B, when the drag touch is located at the one region 151a of the touch screen 151, the controller 180 may display information 13 on the reception message menu on the touch screen 151. Further, when the drag touch is located at the other one region 151b, the controller 180 may control the touch screen 151 to display information 14 on the transmission message menu which is set to correspond to the other one region 151b.

Thus, a user can execute different functions by applying the specific touch input to different positions on the touch screen 151.

Meanwhile, the preset point may be differently determined depending upon the state of the touch screen 151. For instance, as shown in FIG. 3C, when a specific user's request (for instance, when a preset gesture input is sensed or a hardware key provided in the mobile terminal 100 is pressed) is received in a state that screen information 10 is outputted to the touch screen 151, the controller 180 may output the function icons 1a, 1b and 1c corresponding to the specific function on one region of the screen information 10.

In this instance, the preset point may be determined as a point where a function icon to which the drag touch is applied among the function icons 1a, 1b and 1c is outputted.

When the screen information is outputted to the touch screen 151, a user can easily select a specific function including a sub-menu that is desired to be executed by him or her among the plurality of specific functions, by outputting a function icon corresponding to the specific function.

Further, when the specific touch input is applied in a state that screen information is outputted to the touch screen 151, a function which is not desired by a user may be executed according to the type of the screen information, but it is possible to prevent a touch error like this by outputting the function icon to one region of the screen information.

When the specific function is activated, the controller 180 may divide the touch screen 151 into a plurality of regions corresponding to a plurality of sub-menus included in the specific function. In this instance, the controller 180 may display information on a sub-menu corresponding to each region so that a user can check a sub-menu corresponding to each of the plurality of regions. Here, the information on the sub-menu may include all kinds of visual information such as a preview image of an execution screen according to execution of the sub-menu, a character, an image, and an icon indicating the type of sub-menu.

Figure 4A:
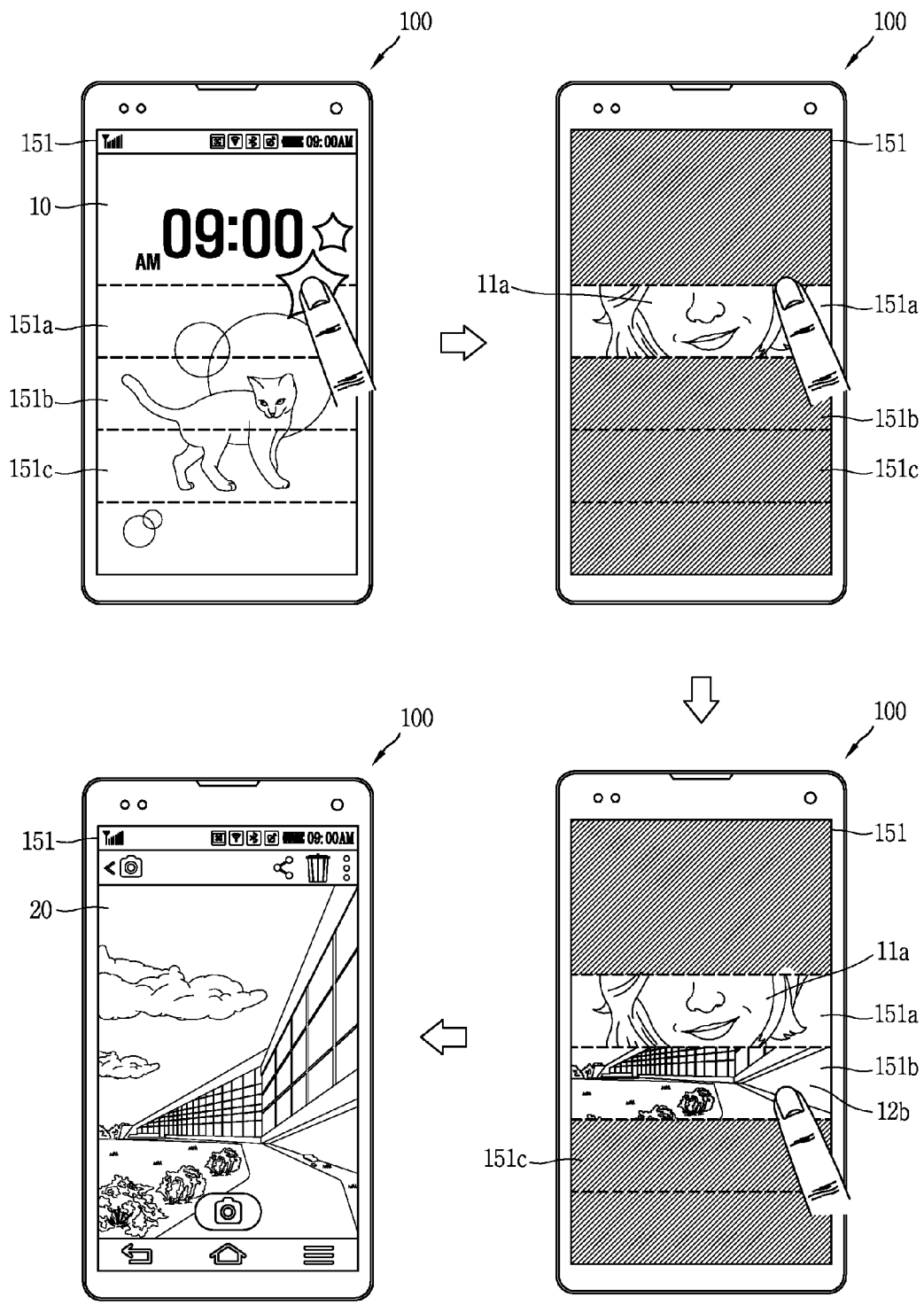
FIGS. 4A, 4B, and 4C are views illustrating a method to provide information of sub-menus corresponding to each of the plurality of regions based on movement of the drag touch.
Figure 4B:
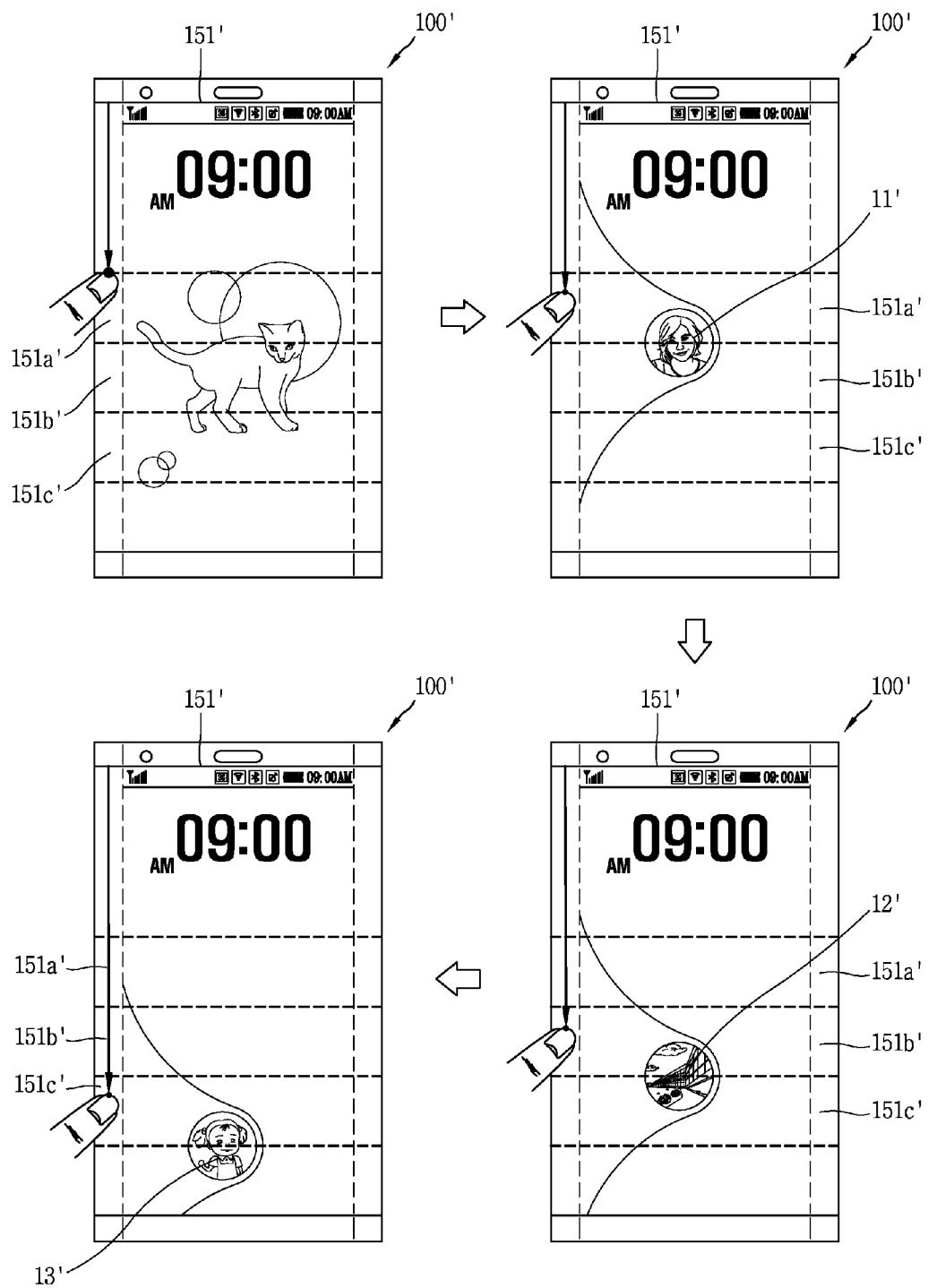
Figure 4C:
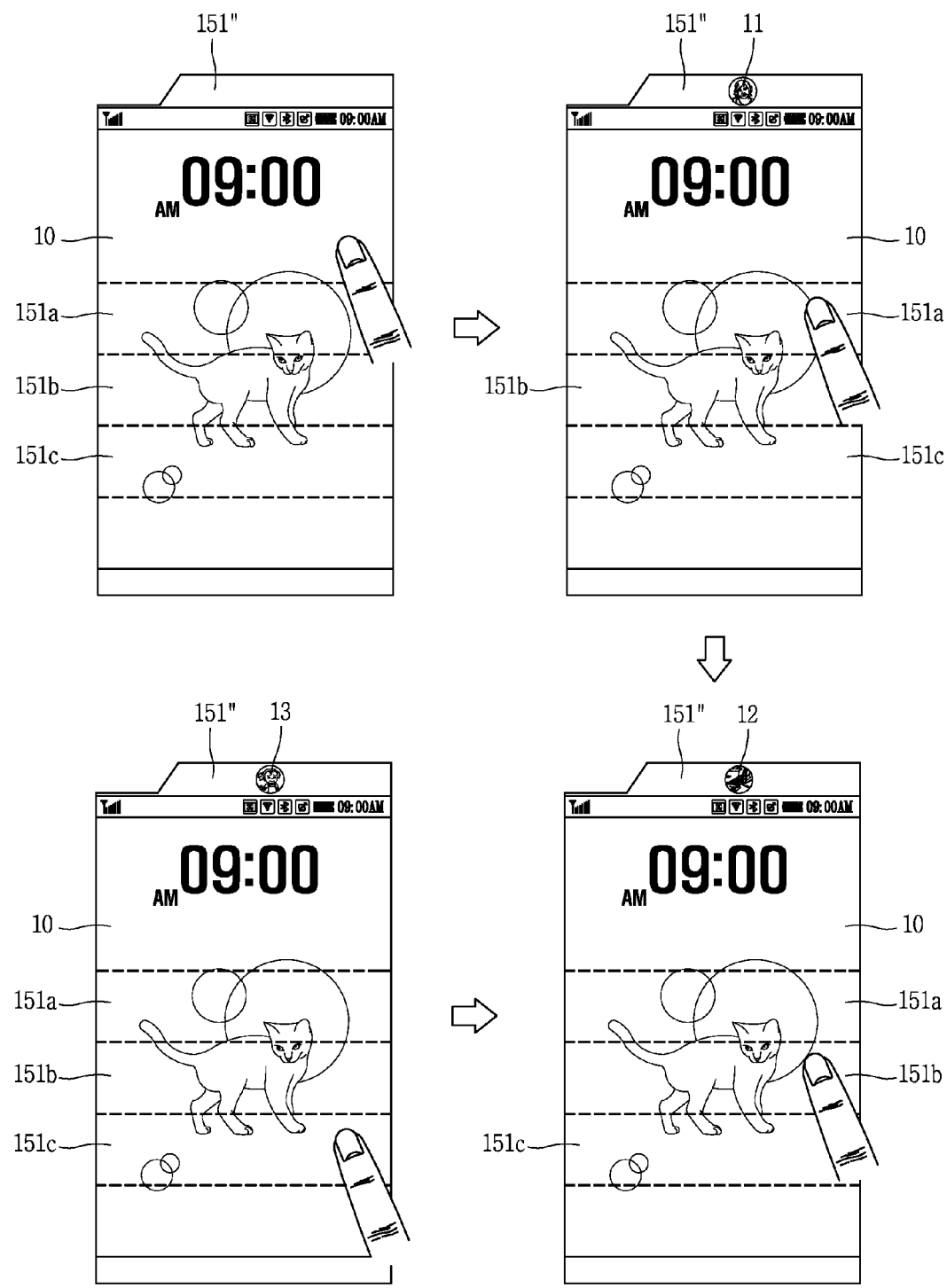

FIG. 4A through 4C are views illustrating an embodiment related to a method to provide information of sub-menus corresponding to each of the plurality of regions based on movement of the drag touch.

Referring first to FIG. 4A, when a point where a specific touch input (for instance, a tap input which is inputted in the preset number) is applied to the touch screen 151 is determined as the preset point, the controller 180 may activate the specific function. For instance, the specific function may be a function corresponding to a camera application which is configured to execute a capturing.

Further, when the specific function is activated, the controller 180 may divide the touch screen 151 into a plurality of regions 151a, 151b and 151c corresponding to a plurality of sub-menus included in the specific function based on the preset point.

In this instance, when the drag touch which is started from the preset point is moved on the touch screen 151, the controller 180 may provide information on the plurality of sub-menus based on the position of the drag touch.

That is, as shown in the second drawing of FIG. 4A, when the drag touch is located at the first region 151a among the plurality of regions 151a, 151b and 151c, the controller 180 may display information 11a on a sub-menu (a first sub-menu) corresponding to the first region 151a on the touch screen 151. In this instance, the controller 180 may control the touch screen 151 to display information 11a on the first sub-menu, which corresponds to the first region 151a, on the first region 151a.

Further, as shown in the third drawing of FIG. 4A, when the drag touch is moved from the first region 151a to the second region 151b among the plurality of regions 151a, 151b and 151c, the controller 180 may display information 12b on the second sub-menu corresponding to the second region 151b on at least part of the touch screen 151. Further, the controller 180 may control the touch screen 151 so that information 12b on the second sub-menu may be displayed on the second region 151b. In this instance, the controller 180 may control the touch screen 151 to maintain display of information 11a on the first sub-menu which is displayed on the first region 151a.

Further, when the drag touch is released on the second region 151b, the controller 180 may execute the second sub-menu corresponding to the second region 151b based on release of the drag touch. That is, the controller 180 may execute only the sub-menu corresponding to a region where the drag touch is released irrespective of an information type of a sub-menu which is displayed on the touch screen 151. Thus, as shown in the fourth drawing of FIG. 4A, an execution screen 20 according to execution of the second sub-menu may be outputted to the touch screen 151.

As described hereinbefore, a user can be provided with information on a sub-menu corresponding to a region where the drag touch is located by moving the drag touch. Further, since the information on the region where the drag touch is located is consistently provided though the drag touch is moved to another region among the plurality of regions, a user can continuously check the sub-menu corresponding to each of the plurality of regions.

Meanwhile, the control method according to an embodiment of the present invention may be implemented in the mobile terminal having a specific structure.

For instance, the mobile terminal according to an embodiment of the present invention may include a touch screen 151' having a front part and a side part. In this instance, a controller of the mobile terminal 100' including the touch screen 151' may determine the preset point based on a drag touch applied to the side part of the touch screen 151'.

That is, as shown in the first drawing of FIG. 4B, a specific function may be activated based on application of a drag touch which is started from one point of the side part of the touch screen 151'. The controller of the mobile terminal 100' may divide the touch screen 151' so as to correspond to the plurality of sub-menus included in the specific function, based on activation of the specific function. In this instance, the plurality of regions may be divided on the front part and the side part connected to the front part of the touch screen 151'.

For instance, as shown in the first drawing of FIG. 4B, the plurality of regions 151a', 151b' and 151c' may be divided on the front part and the side part connected to the front part of the touch screen 151'.

In this instance, as shown in the second drawing of FIG. 4B, when the drag touch is located on the first regions 151a' among the plurality of regions 151a', 151b' and 151c', information 11' on the first sub-menu corresponding to the first region 151a' may be displayed on the touch screen 151'. The controller 180 may control the touch screen 151' to display information 11' on the first sub-menu on the front part of the touch screen 151'.

Similarly, as shown in the third drawing of FIG. 4B, when the drag touch is moved from the first region 151a' to the second region 151b', the controller may output information 12' on the second sub-menu corresponding to the second region 151b' to the front part of the touch screen 151'. Further, as shown in the fourth drawing of FIG. 4B, when the drag touch is moved from the second region 151b' to the third region 151c', information 13' on the third sub-menu corresponding to the third region 151c' may be displayed on the front part of the touch screen 151'.

Meanwhile, the controller may execute the sub-menu not only when the drag touch is released from one region of the side part, but also in a case where the drag touch is released after being applied toward the front part of the touch screen where information on the sub-menu is displayed.

When the present invention is implemented in the mobile terminal having the specific structure as described hereinbefore, a region where the drag touch is applied and a region where information on the sub-menu is displayed may be clearly discriminated. Accordingly, a user can be provided with convenience in that it is possible to more clearly check information on the sub-menu and execute the sub-menu through a structurally discriminated region.

As another embodiment, a specific part in which the touch screen of the mobile terminal is extended along one direction may be included. That is, as shown in FIG. 4C, in case of a mobile terminal including a hetero-type touch screen (display), the controller may provide information on the sub-menu included in the specific function using a specific part of the touch screen.

More specifically, as shown in the first drawing of FIG. 4C, the touch screen may be divided into a plurality of regions a 151a, 151b and 151c corresponding to the plurality of sub-menus included in the specific function, respectively, and as shown in the second drawing of FIG. 4C, a drag touch may be located at the first region 151a among the plurality of regions a 151a, 151b and 151c. In this instance, the controller may output an icon 11 including information on the first sub-menu corresponding to the first region 151a to the specific part 151".

Further, as shown in the third and fourth drawings of FIG. 4C, the controller may control the touch screen to output icons 12 and 13 including information on the second and third sub-menus corresponding to the second region 151b and the third region 151c to the specific part 151", based on movement of the drag touch to the second and third regions 151b and 151c.

Thus, a user can be provided with information corresponding to the sub-menu included in the specific function through the specific part 151" of the touch screen, while being provided with his/her desired screen from the touch screen.

Meanwhile, in a case where the drag touch is released, a sub-menu corresponding to a region where the drag touch is released is executed, and an execution screen according to execution of the sub-menu may be outputted to at least part of the touch screen.

Figure 5A:
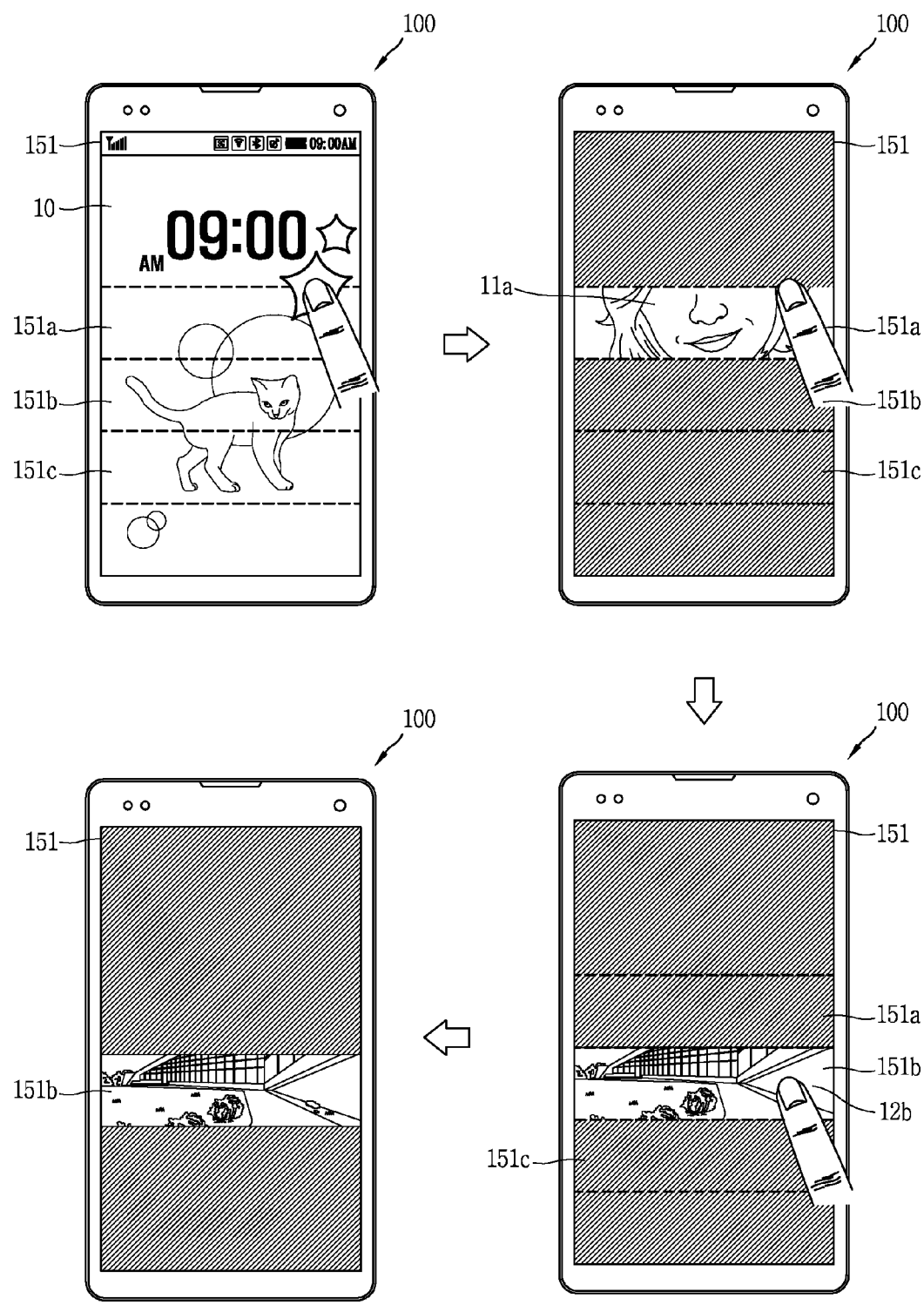
FIGS. 5A and 5B are views illustrating an example in which an execution screen of a sub-menu is outputted to the touch screen.
Figure 5B:
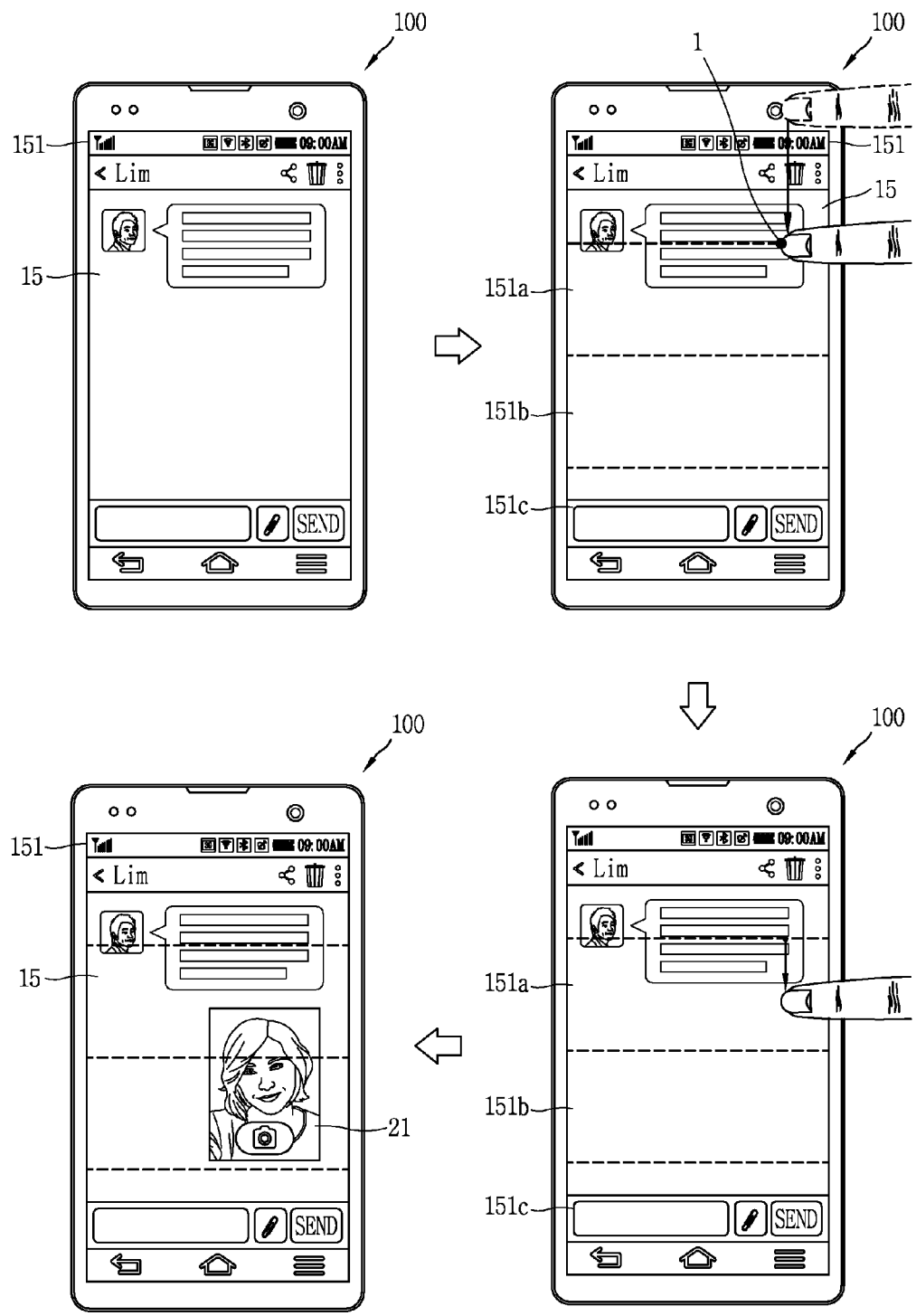

FIGS. 5A and 5B are views illustrating an example in which an execution screen of a sub-menu is outputted to the touch screen.

Referring to FIG. 5A, a preset point is determined based on application of a specific touch input to the touch screen 151, and the specific function may be activated based on application of the drag touch from the preset point. Further, the controller 180 may divide the touch screen 151 into a plurality of regions 151a, 151b and 151c corresponding to each of the plurality of sub-menus included in the specific function.

In this instance, as shown in the second drawing of FIG. 5A, when the drag touch is located at the first region 151a among the plurality of regions 151a, 151b and 151c, the controller 180 may display information 11a on the first sub-menu, which corresponds to the first regions 151a, on the first region 151a. Further, as shown in the third drawing of FIG. 5A, when the drag touch is moved from the first region 151a to the second region 151b, the controller 180 terminates display of the information 11a on the first sub-menu, and may control the touch screen 151 to display information 12b on the second sub-menu, which corresponds to the second region 151b, on the second region 151b.

When one sub-menu included in the specific function is executed, an execution screen of the one sub-menu may be outputted only to a specific part of the region of the touch screen. Here, since the specific part of the region may be set to have various size and position, the mobile terminal according to an embodiment of the present invention can provide visual interesting to a user through an execution screen of a sub-menu having specific visual effect to a user. Further, the user can execute the sub-menu and at the same time utilize a remaining region other than the specific part of the region on the touch screen.

Unlike the above, as shown in the second drawing of FIG. 5B, the specific function may be activated based on the specific touch input in a state that an execution screen 16 of an arbitrary application is outputted to the touch screen 151, as shown in the first drawing of FIG. 5B, In this instance, the controller 180 may divide the touch screen 151 into a plurality of regions 151a, 151 b and 151 c corresponding to each of the plurality of sub-menus included in the specific function, in a state that the execution screen 15 is outputted.

Further, when a drag touch is applied to the touch screen 151 in a state that the specific function is activated, the controller 180 may recognize the drag touch as an input to select the sub-menu included in the specific function. That is, the controller 180 may limit a function related to the execution screen 15 to be executed by the drag touch.

In this instance, as shown in the third drawing of FIG. 5B, when the drag touch is released at the first region 151a among the plurality of regions 151a, 151b and 151c, the controller 180 may execute a sub-menu corresponding to the first region 151a. And, as shown in the fourth drawing of FIG. 5B, the controller 180 may control the touch screen 151 to output the execution screen 21 of the sub-menu to the execution screen 15 with a preset size in an overlapping manner.

In a case where the execution screen 21 of the sub-menu is outputted, the controller 180 may execute different controls according to a position where a touch is applied to the touch screen 151. For instance, when a touch is applied to the execution screen 21 of the sub-menu, the controller 180 may execute a function related to the execution screen 21 of the sub-menu based on the touch. As another example, in a case where a touch is applied to the execution screen 15 except the execution screen 21 of the sub-menu, the controller 180 may execute a function related to the execution screen 15 based on the touch.

In a case where the specific function is activated in a state that an execution screen corresponding to a function other than the specific function is outputted to the touch screen 151, the controller 180 may output the execution screen of the sub-menu of the specific function to part of the execution screen corresponding to the other function in an overlapping manner. Thus, a user can immediately execute a sub-menu of the second function which is different from the first function while executing the first function using the touch screen, and can continuously use the first function which has been executing, while executing the sub-menu of the second function.

Hereinbefore, an embodiment to execute one sub-menu included in the specific function has been described. Hereinafter, an embodiment to execute together a plurality of sub-menus included in the specific function, with reference to FIGS. 6A and 6B.

Figure 6A:
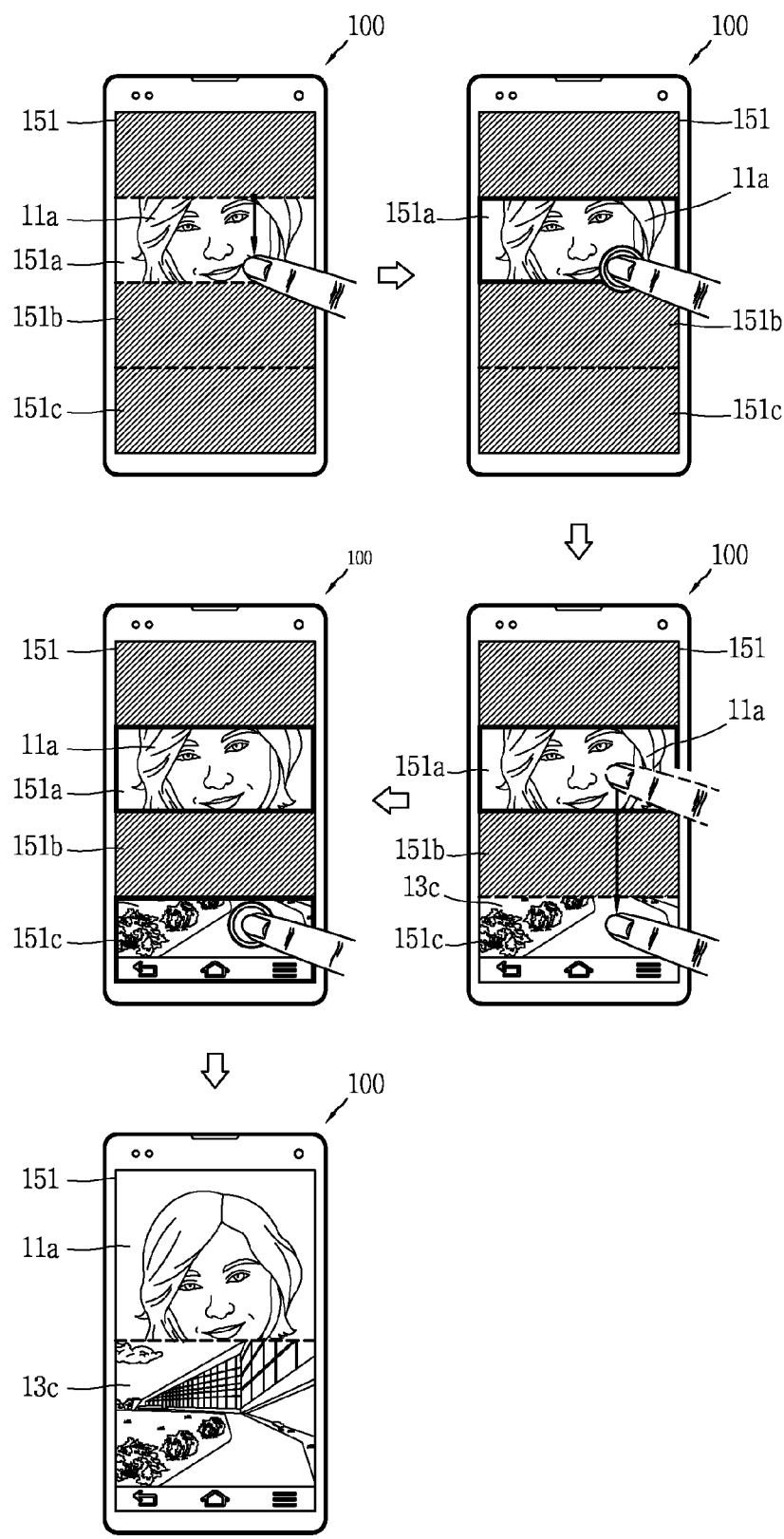
FIGS. 6A and 6B are views illustrating an example in which at least two sub-menus are executed together.
Figure 6B:
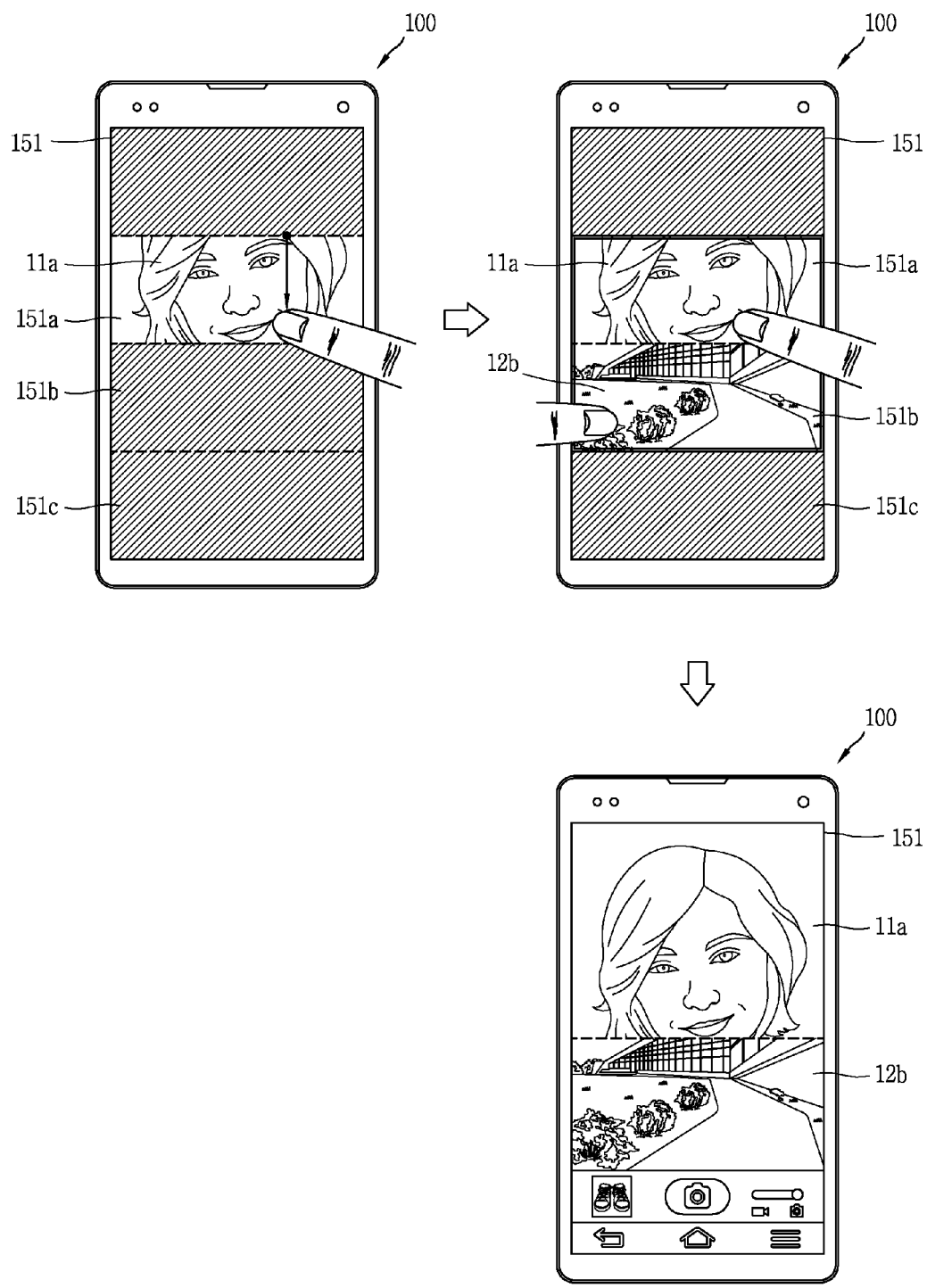

FIGS. 6A and 6B are views illustrating an embodiment to execute at least two sub-menus together.

Referring to FIG. 6A, the drag touch is located at the first region 151a of the touch screen 151, and the controller 180 may display information 11a on the first sub-menu, which corresponds to the first region 151a, on the first region 151a. In this instance, as shown in the second drawing of FIG. 6A, when the drag touch is held at the first regions 151a for a preset time, the controller 180 may specify the first sub-menu as an object to be executed, and control the touch screen 151 to distinguishably display the first region 151a, as shown in the second drawing of FIG. 6A.

Further, the drag touch which has been held at the first region 151a may be moved to the third region 151c without being released. The controller 180 may control the touch screen 151 to display information 13c on the third sub-menu corresponding to the third region 151c on the third region 151c, as shown in the third drawing of FIG. 6A.

When the drag touch which has been moved to the third region 151c is held at the third region 151c for more than a preset time, the controller 180 may specify the third sub-menu as an object to be executed, and control the touch screen 151 to distinguishably display the third regions 151c, as shown in the fourth drawing of FIG. 6A.

In this instance, in a case where the drag touch is released on the third region 151c, the controller 180 may execute together the sub-menus which have been specified before the drag touch is released. That is, the controller 180 may execute the first sub-menu and the third sub-menu together.

Further, the controller 180 may control the touch screen to output together the execution screen 11a of the first sub-menu and the execution screen 13c of the third sub-menu together, as shown in the fifth drawing of FIG. 6A.

Unlike this, though not shown, the execution screens according to execution of the first sub-menu and the third sub-menu may be limitedly outputted to the first and third regions. That is, as the plurality of sub-menus included in the specific function are executed together, an execution screen corresponding to each of the plurality of sub-menus may be outputted to the touch screen in a various manner.

Thus, a user can easily execute at one time the plurality of sub-menus included in the specific function in a simple process like adjusting the time that the drag touch is located at the plurality of regions. Further, a user can be provided with convenience in that it is possible to check information on the plurality of sub-menus which is desired to be executed by him/her, by distinguishably displaying a region corresponding to one sub-menu selected by a user.

Unlike this, the controller 180 may execute together a plurality of sub-menus included in the specific function based on a specific touch which is additionally applied to the drag touch.

That is, as shown in the first drawing of FIG. 6B, a specific function is activated based on application of a drag touch to a preset point, and the drag touch may be located at the first region 151a among the plurality of regions corresponding to a plurality of sub-menus included in the specific function. Further, as shown in the second drawing of FIG. 6B, an additional touch may be applied to the second region 151b in a state that the drag touch is located on the first region 151a.

In this instance, the controller 180 may specify a first sub-menu corresponding to the first region 151a where the drag touch is located, and a second sub-menu corresponding to the second region 151b where an additional touch is applied in a state that the drag touch is located. Further, as shown in the second drawing of FIG. 6B, the controller 180 may distinguishably display the regions 151a and 151b corresponding to the specified sub-menus so as to be provided with information on the sub-menus selected by a user.

Under the state, as shown in the third drawing of FIG. 6B, when the drag touch is released, the controller 180 may execute the first and second sub-menus together. Further, the controller 180 may output together execution screens 11a and 12b corresponding respectively to the first and second sub-menus to the touch screen 151.

The additional touch may include all kinds of touches which are applied while the drag touch is maintained. The controller 180 may execute the specified sub-menus based on release of the drag touch. That is, the additional touch may only be processed as an input to select sub-menus included in a region other than the region where the drag touch is maintained.

Thus, there is an effect in that a user can execute together a plurality of functions included in the specific function using the additional touch which is applied to a region other than the region where the drag touch is applied.

Meanwhile, the controller 180 may activate the first function and the second function together as the specified function based on a condition that the preset point satisfies a specified condition. For instance, the specified condition may be either a case that the preset point is included in the preset region of the touch screen, or a case that the point corresponds to the specific object included in the screen information which is outputted to the touch screen.

Here, the first and second functions may be related to each other. For instance, the second function may be a function which is executed by using data used in executing the first function. More specifically, the second function may be a function which stores data formed by execution of the first function or shares the data with an external server.

The controller 180 may divide the touch screen into a plurality of regions based on the sub-menus included in the first and second functions, respectively, in a case where the first and second functions are activated together.

More specifically, the controller 180 may divide the touch screen 151 into a plurality of sections as much as the number of the sub-menus included in the first function along a first direction from a preset point. Further, the controller 180 may divide the touch screen 151 into a plurality of sections as much as the number of the sub-menus included in the second function along a second direction (for instance, a direction crossed with the first direction), which is different from the first direction, from a preset point. And the controller 180 may divide the touch screen 151 into a plurality of regions which are formed by a plurality of sections divided along the first and second directions.

Further, in a case where a drag touch which is started from the preset point is released at the specific region among the plurality of regions, the controller 180 may execute at least one of the sub-menus of the first function and the sub-menus of the second function based on the specific region.

Figure 7A:
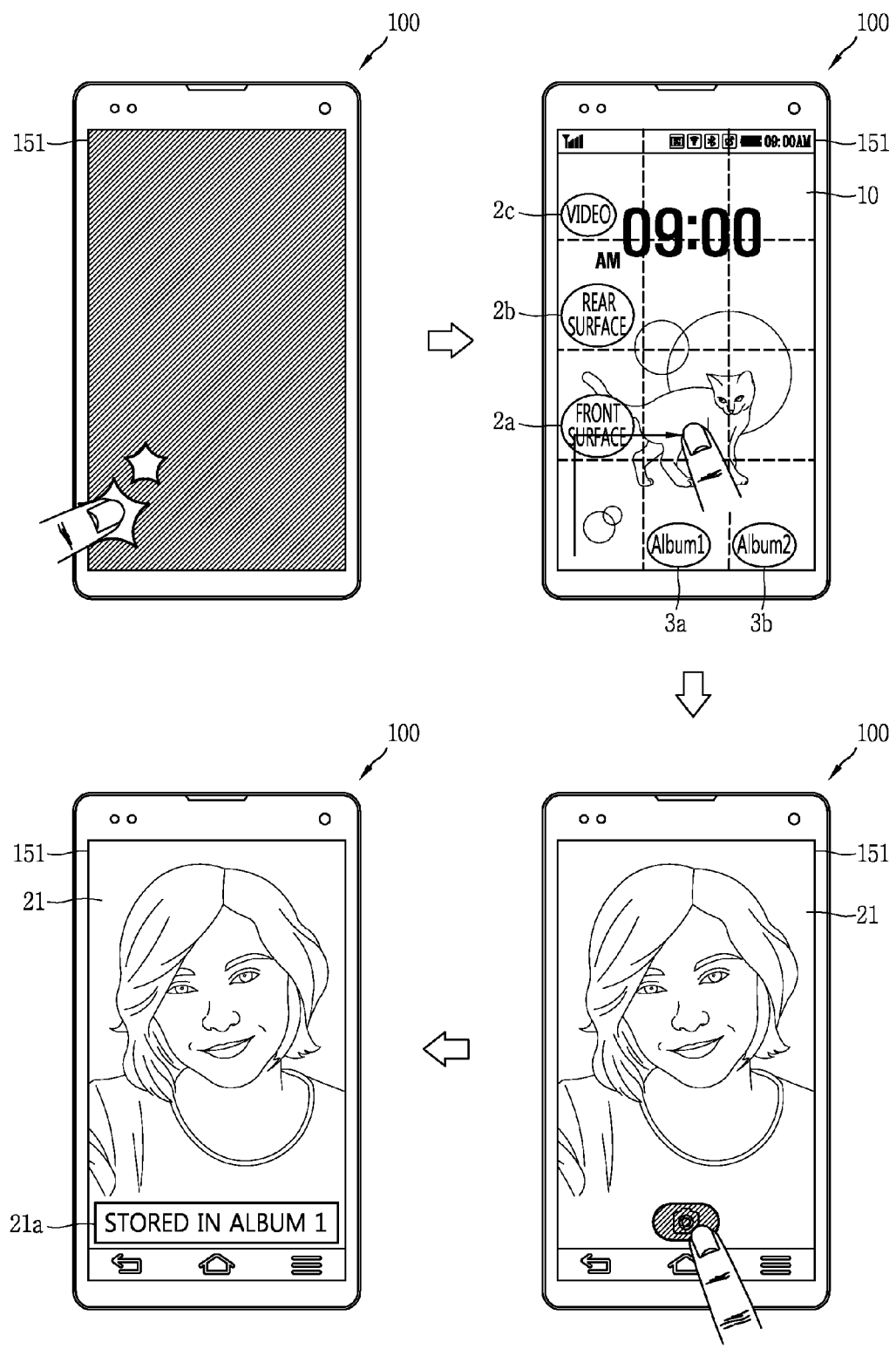
FIGS. 7A and 7B views illustrating an example in which the sub-menus included in the first and second functions, respectively, are executed together.
Figure 7B:
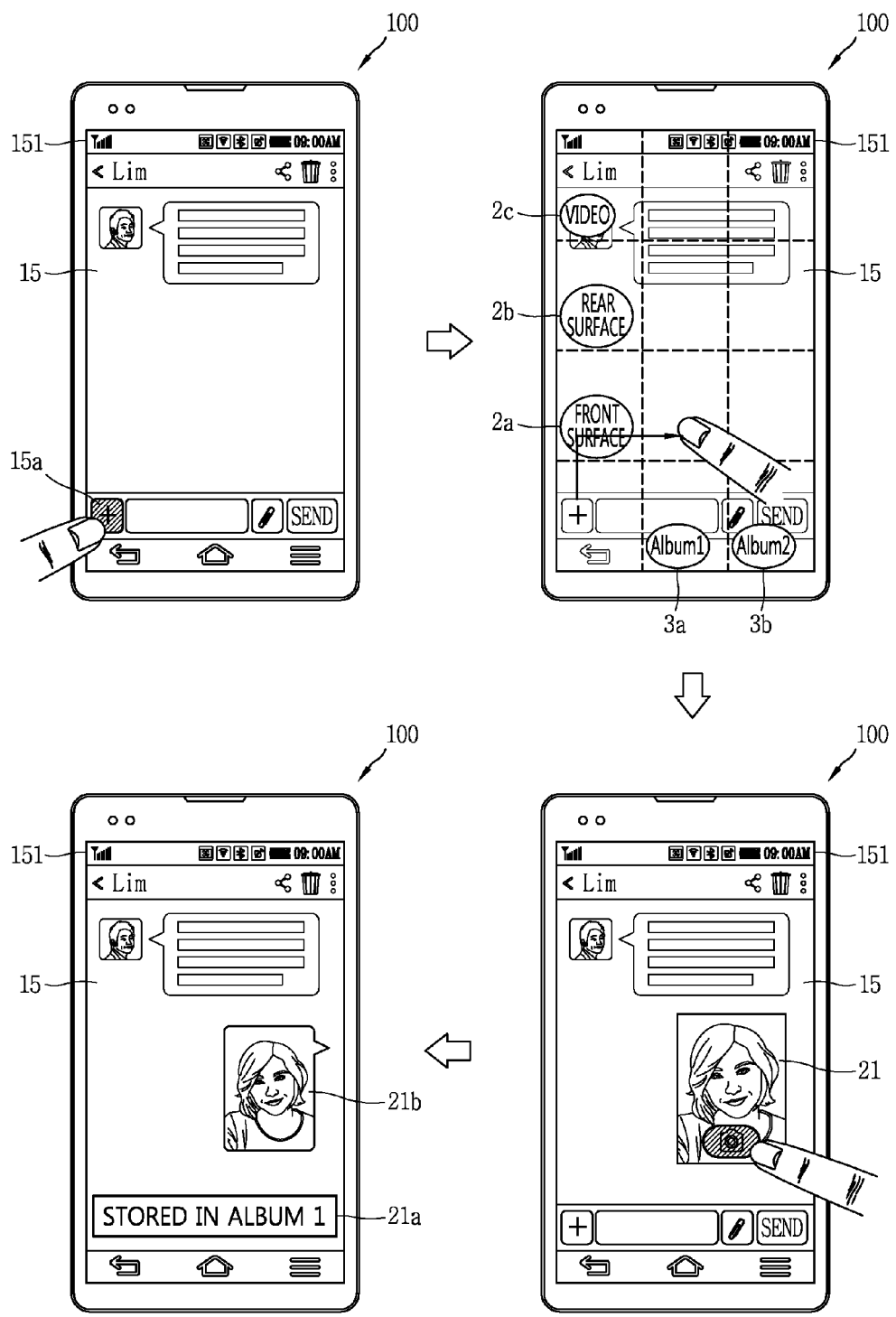

FIGS. 7A and 7B views illustrating an example in which the sub-menus included in the first and second functions, respectively, are executed together.

Referring to FIG. 7A, a specific touch may be applied to a preset region of the touch screen 151 in a state that a lighting of the touch screen 151 is not activated. For instance, the preset region may be a region which is located at an edge of the touch screen 151.

The controller 180 may activate the first and second functions as a specific function based on application of the specific touch input to the preset region. For instance, the first function may be a function corresponding to a camera application and the second function may be a function corresponding to an album application which stores image information captured by a camera.

Further, the controller 180 may divide the touch screen 151 into a plurality of sections as much as the number of the sub-menus included in the first function and the second function, respectively, along the first direction and the second direction which crosses with the first direction from the preset point.

That is, as shown in the second drawing of FIG. 7A, the controller 180 may divide the touch screen 151 into a plurality of sections as much as the number (three) of the sub-menus included in the first function along the first direction (for instance, a lengthwise direction of the mobile terminal). And the controller 180 may display information 2a, 2b and 2c of the sub-menus included in the first function on the plurality of sections, respectively.

Further, the controller 180 may divide the touch screen 151 into a plurality of sections as much as the number (two) of the sub-menus included in the second function along the second direction which crosses with the first direction. And the controller 180 may display information 3a and 3b of the sub-menus included in the second function on the plurality of sections, respectively.

Thus, the touch screen 151 may be divided into a plurality of regions which are formed by crossing the plurality of sections divided along the first and second directions.

As shown in the second drawing of FIG. 7A, the drag touch which is started from the preset point may be released after moving to the specific region among the plurality of regions. In this instance, the controller 180 may select one sub-menu 3a corresponding to the specific region among the sub-menus of the second function, based on the position of the specific region. Further, the controller 180 may select one sub-menu 2a corresponding to the specific region among the sub-menus of the first function, based on the position of the specific region.

When the sub-menu of the first function and the sub-menu of the second function corresponding to the position of the specific region are selected, the controller 180 may execute together the selected sub-menus of the first and second functions. Further, the controller 180 may execute consecutively the sub-menu of the first function and the sub-menu of the second function.

That is, as shown in the third drawing of FIG. 7A, the controller 180 may control the touch screen 151 to output the execution screen 21 according to execution of the sub-menu of the first function. When a specific data (for instance, a front capturing image) is formed by execution of the sub-menu of the first function, as shown in the third drawing of FIG. 7A, the controller 180 may execute the sub-menu of the second function using the specific data. Thus, as shown in the fourth drawing of FIG. 7A, the specific data may be used in executing the sub-menu (a menu for storing a captured image to an album 1) of the second function.

As the preset point satisfies a specific condition, the controller 180 may activate together the functions which are related to each other with a specific function. Further, a user can execute the sub-menus included respectively in different functions together or in association with each other by changing a region where the drag touch which has been applied to the preset point is released.

Though not shown, when the drag touch is released after moving along the first direction from the preset point, the controller 180 may independently execute only the sub-menu of the first function. That is, the controller 180 may execute separately or together the sub-menu of the first function and the sub-menu of the second function, based on a coordinate value of the region where the drag touch is released.

Unlike this, as shown in FIG. 7B, when specific screen information is outputted to the touch screen 151 (for instance, in a case where an execution screen 15 of one application is outputted), a specific object 15a included in the execution screen of the one application may be determined as the preset point. Here, the specific object 15a may be a control object which receives an input of a control command for executing a function related to the one application.

When a specific touch input (a long touch input) is applied to the specific object, the controller 180 may activate the first function and the second function together as the specific function. Further, the touch screen 151 may be divided into a plurality of regions based on the sub-menus which are included in the first and second functions, respectively.

In this instance, as shown in the second drawing of FIG. 7B, when the drag touch is released at the specific region among the plurality of regions, the controller 180 may execute the sub-menu of the first function and the sub-menu of the second function corresponding to the specific region.

However, unlike FIG. 7A, in a case where an execution screen 15 of one application is outputted to the touch screen 151, the controller 180 may output the execution screen 21 of the sub-menu of the first function to part of the execution screen 15 in an overlapping manner. Under the state, when the sub-menu of the first function is executed, the controller 180 may use a specific data which is formed according to execution of the sub-menu of the first function in executing the sub-menu of the second function.

Further, the controller 180 may process the specific date in association with the one application. For instance, in a case where the one application is a messenger application which can share information with other terminals, the controller 180 may execute a function to transmit the specific data to the other terminals.

Thus, as shown in the fourth drawing of FIG. 7B, information 21a indicating that a sub-menu of the second function is executed may be outputted to the touch screen 151 by using the specific data. Further, the specific data 21b which has been transmitted to the other terminal may be displayed on the execution screen 15 of the messenger application.

When the first function and the second function are activated together in a state that specific screen information is outputted to the touch screen, the controller 180 may process the sub-menus which are selected from the first and second functions, respectively, in association with the specific screen information. Thus, a user can process the sub-menus included in each different function with one drag touch in association with specific screen information which are being output.

Meanwhile, when the preset point satisfies with a specific condition, for instance, when the preset point corresponds to a specific object included in the specific screen information which is outputted to the touch screen 151, the controller 180 may activate the function corresponding to the specific screen information as the specific function.

Figure 8:
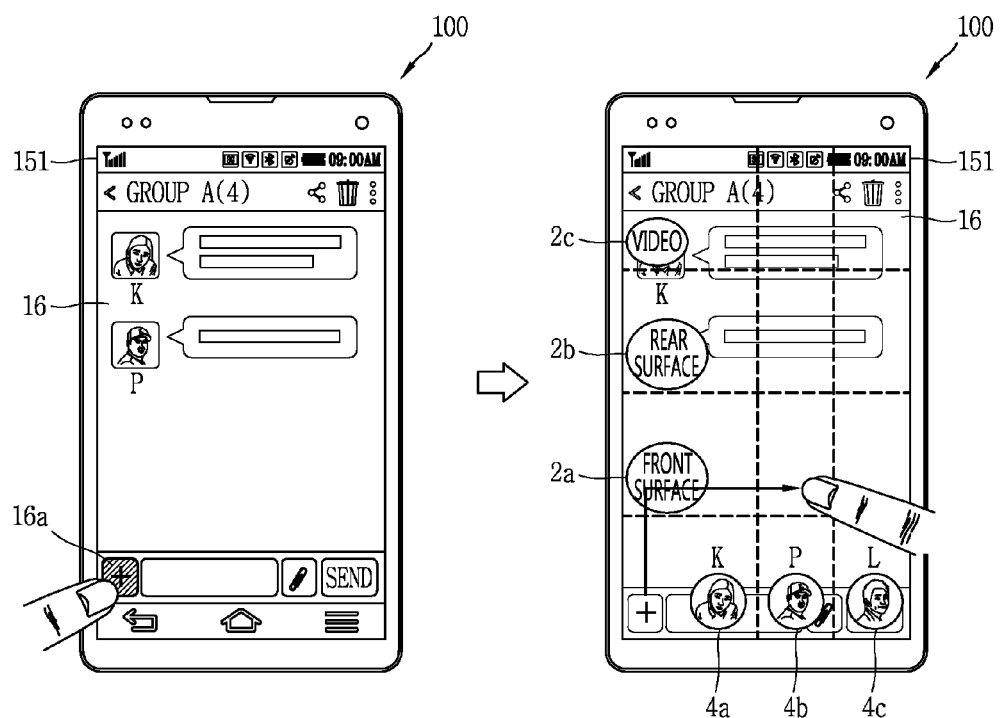
FIG. 8 is a view illustrating an example in which a function corresponding to screen information outputted to the touch screen is activated as a specific function.

FIG. 8 is a view illustrating an example in which a function corresponding to screen information outputted to the touch screen is activated as a specific function.

The controller 180 may activate the first function which is set to correspond to the preset point as a specific function, based on application of a drag touch which is started at the preset point. In this instance, when the preset point satisfies the specific condition, the controller 180 may activate a function related to screen information which is outputted to the touch screen 151 as a second function together with the first function which is set to correspond to the preset point.

For instance, the controller 180 may activate the function corresponding to the screen information which is outputted to the touch screen 151 as the second function. Further, the controller 180 may activate functions which may be executable by using information which is outputted to the touch screen 151 as the second function.

That is, as shown in the first drawing of FIG. 8, the specific object 16a included in the specific screen information 16 may be determined as a preset point in a state that specific screen information 16 (for instance, an execution screen of a messenger application including a plurality of objects to be selected) is outputted. In this instance, the controller 180 may divide the touch screen 151 into a plurality of sections along the first direction and the second direction which crosses with the first direction from the preset point.

And as shown in the second drawing of FIG. 8, the controller 180 may display information 2a, 2b and 2c on the sub-menu included in the first function (for instance, a function corresponding to a camera application) which is set to correspond to the preset point, along the first direction from the preset point.

Further, the controller 180 may activate a function related to the specific function 16 as the second function. For instance, as shown in the second drawing of FIG. 8, the second function may be a function (for instance, a messenger function which can transceive (transmit and receive) data with a plurality of selection objects) which may be processed by using a plurality of selection objects included in the specific screen information 16. Thus, when the second function is activated, the controller 180 may display information of the plurality of selection objects 4a, 4b and 4c, respectively, included in the specific screen information 16 on each of the plurality of sections which are divided along the second direction.

As shown in the second drawing of FIG. 8, the drag touch which is started from the preset point is released on the specific region among the plurality of regions, the controller 180 may execute the sub-menu of the first function corresponding to the specific region. Further, the controller 180 may process execution of the sub-menu of the first function in association with a selection object 4a corresponding to the specific region.

More specifically, as shown in the third drawing of FIG. 8, the controller 180 may output the execution screen 21 of the sub-menu of the first function to part of the specific screen information 16 in an overlapping manner. Further, when the sub-menu of the first function is executed, the controller 180 may transmit data which is formed by execution of the sub-menu of the first function to the selection object 4a corresponding to the specific region.

Accordingly, as shown in the fourth drawing of FIG. 8, information 16b on the execution of the function that the data 21a is transmitted to the selection object 4a may be outputted to one region of the touch screen 151. In this instance, the controller 180 may control the touch screen 151 to maintain the output of the specific screen information 16 though execution of the first and second functions is performed.

When the specific screen information including a plurality of selection objects is outputted to the touch screen 151, the controller 180 may select a function related to the specific screen information as a specific function which is activated by the drag touch. Thus, a user can execute a sub-menu of the other function while using a function which is being currently executed, and easily process the sub-menu of the other function in association with the screen which is being currently outputted.

As described hereinbefore, the control method according to the present invention may be applicable to the case where the touch screen 151 is divided into a plurality of sections corresponding to a plurality of sub-menus included in the specific function based on the preset point, and to the case where at least one sub menu among the plurality of sub-menus is executed. Unlike this, the control method according to the present invention may also be applicable to the case where the touch screen 151 is divided into a plurality of sections corresponding to a plurality of functions of similar attributes based on the preset point, and at least one function is executed.

Figure 9:
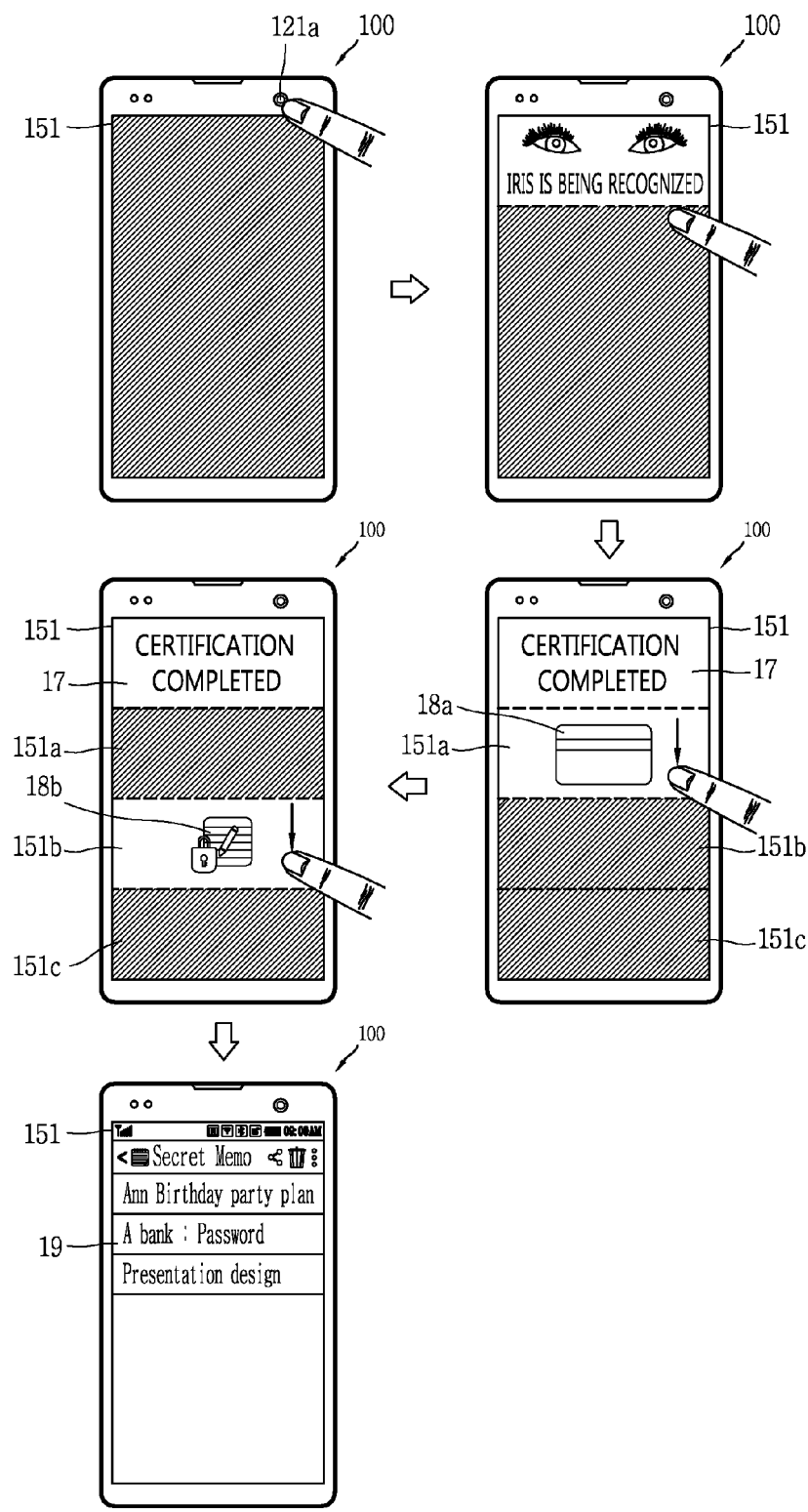
FIG. 9 is a view illustrating an example in which at least part of a plurality of functions having similar attributes is immediately executed by a drag touch.

FIG. 9 is a view illustrating an example in which at least part of a plurality of functions having similar attributes is immediately executed by a drag touch.

The mobile terminal 100 may execute a plurality of functions and part of the plurality of functions may be a function which requires a preset procedure before execution thereof. For instance, part of the plurality of functions may be a function that is executable by an admitted user by a preset certification procedure. As a further specific example, part of the functions may be a function corresponding to a security-related application which is executable in a case where it is determined as an admissible user based on the preset certification information (fingerprint, iris, password, pattern information, or the like).

In this instance, when one preset certification is executed, part of the security-related functions can be simply executed by one drag touch. That is, referring to FIG. 9, in a case where a drag touch which is started from one point 121a of the bezel part of the mobile terminal 100 is applied to the touch screen 151, when the drag touch is held at one point of the touch screen 151, the controller 151 may recognize the held drag touch as a specific touch input.

And the controller 180 may determine the point where the drag touch is held on the touch screen 151 as the preset point. Further, the controller 180 may activate the front camera 121a and execute a preset certification procedure. For instance, as shown in the second drawing of FIG. 9, the controller 180 may execute the preset certification function after capturing the iris of a user by using the camera 121a.

When the certification is completed by the certification function, information 17 on the completion of certification may be displayed on one region of the touch screen 151. Further, the controller 180 may activate the plurality of functions which require execution of the certification function as a precondition. And the controller 180 may divide the touch screen 151 into a plurality of regions 151a, 151b and 151c corresponding respectively to the plurality of functions.

In this instance, the controller 180 may display information on the functions corresponding to the plurality of regions 151a, 151b and 151c, respectively, on at least part of the touch screen 151, based on movement of the drag touch at the preset point. For instance, as shown in the third drawing of FIG. 9, when the drag touch is located at the one region 151a, the controller 180 may display information 18a on one function (mobile payment function) corresponding to the one region 151a.

Further, as shown in the fourth drawing of FIG. 9, when the drag touch is moved from the one region 151a to another region 151b, the controller 180 may display information 18b on a function (secret memo function) corresponding to the region 151b on the other region 151b.

And when the drag touch is released, the controller 180 may execute a function corresponding to a function corresponding to the region where the drag touch is released, and output an execution screen according to execution of the function to at least part of the touch screen 151. Thus, as shown in the fifth drawing of FIG. 9, the execution screen 19 of a secret memo function which has been executed based on release of the drag touch at the other region 151b may be outputted to the touch screen 151.

As described hereinbefore, according to the control method of the present invention, it is possible to selectively execute a plurality of functions which are prerequisite to the specific procedure after executing the specific procedure which is prescribed by the execution of the functions by using a drag touch one time.

According to the present invention, since it is possible to execute a sub-menu included in the specific function by applying a touch one time to the touch screen, a user can omit a series of procedure in which a specific function is searched, and a plurality of sub-menus included in the specific function are selected and executed.

Further, since it is possible to execute together or process in association with the plurality of sub-menus included in the specific function by controlling variously the direction and maintaining time of the touch applied to the touch screen, a user can be provided with convenience to process various functions by a simple operation.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless Alternatively specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
 a touch screen disposed at a first side of the mobile terminal and configured to display information; and
 a controller configured to:
 divide the touch screen into a plurality of regions corresponding to a first function in response to a touch drag starting from a preset point on the first side, wherein the plurality of regions correspond to a plurality of sub-menus of the first function;
 execute the first function according to a sub-menu corresponding to a region where the touch drag is released; and
 cause the touch screen to display an execution screen of the executed first function according to the sub-menu to at least part of the touch screen;
 wherein the plurality of regions comprises a first region corresponding to the first sub-menu and a second region corresponding to a second sub-menu, and the controller is further configured to:
 execute the first function according to the first sub-menu and the second sub-menu when the touch drag is maintained at the first region for a predetermined length of time then moved to the second region and released at the second region.

2. The mobile terminal of claim 1, wherein the preset point is determined based on a position where a specific touch input is applied to the first side.

3. The mobile terminal of claim 2, wherein the first function is based on a position where the specific touch input is applied to the touch screen.

4. The mobile terminal of claim 1, wherein the preset point corresponds to a display position of a function icon corresponding to the first function when screen information is displayed on the touch screen.

5. The mobile terminal of claim 1, wherein the controller is further configured to divide the plurality of regions based on a position of the preset point on the first side.

6. The mobile terminal of claim 1, wherein the controller is further configured to cause the touch screen to display information related to each corresponding sub-menu as the touch drag is moved across the plurality of regions.

7. The mobile terminal of claim 6, wherein the controller is further configured to:
 cause the touch screen to display first information related to a first sub-menu corresponding to a first region when the touch drag is located at the first region; and
 cause the touch screen to terminate displaying the first information and display second information related to a second sub-menu corresponding to a second region when the touch drag is moved from the first region to the second region.

8. The mobile terminal of claim 7, wherein the first information is displayed on the first region and the second information is displayed on the second region.

9. The mobile terminal of claim 8, wherein the controller is further configured to execute the first function according to the second sub-menu and cause the touch screen to display an execution screen of the first function according to the second sub-menu when the touch drag is released at the second region.

10. The mobile terminal of claim 1, wherein the controller is configured to cause the touch screen to display a first execution screen corresponding to the executed first function according to the first sub-menu and a second execution screen corresponding to the executed first function according to the second sub-menu to at least part of the touch screen.

11. The mobile terminal of claim 1, wherein the controller is further configured to cause the touch screen to continue displaying the first information when the touch drag is moved to the second region.

12. The mobile terminal of claim 1, wherein:
 the plurality of regions are divided along a first direction and a second direction;
 a first sub-group of regions divided along the first direction correspond to sub-menus of the first function;
 a second sub-group of regions divided along the second direction correspond to sub-menus of a second function, wherein the first sub-group of regions and the second sub-group of regions intersect; and
 the controller is further configured to execute at least the first function according to a sub-menu of the first function or execute the second function according to a sub-menu of the second specific function when the touch drag is released at a specific region.

13. The mobile terminal of claim 12, wherein the controller is further configured to:
 select the sub-menu of the first function and the sub-menu of the second function based on a position of the specific region of the touch screen; and
 consecutively execute the first function according to the sub-menu of the first function and the second function according to the sub-menu of the second function.

14. The mobile terminal of claim 13, wherein the controller is further configured to execute the second function according to the sub-menu of the second function using specific data related to execution of the first function according to the sub-menu of the first function when the first function is executed.

15. A method for controlling the mobile terminal, the method comprising:
 dividing the touch screen into a plurality of regions corresponding to a first function in response to a touch drag starting from a preset point on a first side of the mobile terminal, wherein the plurality of regions correspond to a plurality of sub-menus of the first function;
 executing the first function according to a sub-menu corresponding to a region where the touch drag is released; and
 displaying an execution screen of the executed first function according to the sub-menu to at least part of a touch screen of the mobile terminal, wherein the plurality of regions comprises a first region corresponding to the first sub-menu and a second region corresponding to a second sub-menu, and the method further comprises:

executing the first function according to the first sub-menu and the second sub-menu when the touch drag is maintained at the first region for a predetermined length of time then moved to the second region and released at the second region.

16. The method of claim 15, wherein the preset point is determined based on a position where a specific touch input is applied to the first side.

17. The method of claim 16, wherein the first function is based on a position where the specific touch input is applied on the touch screen.

18. The method of claim 15, wherein the plurality of regions are divided based on a position of the preset point on the first side.

19. The method of claim 15, further comprising displaying information related to each corresponding sub-menu as the touch drag is moved across the plurality of regions.

* * * * *